(12) United States Patent (10) Patent No.: US 8,868,634 B2
Arekapudi et al. (45) Date of Patent: Oct. 21, 2014

(54) METHOD AND APPARATUS FOR PERFORMING MULTIPLICATION IN A PROCESSOR

(75) Inventors: Srikanth Arekapudi, Sunnyvale, CA (US); Sudherssen Kalaiselvan, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 411 days.

(21) Appl. No.: 13/309,721

(22) Filed: Dec. 2, 2011

(65) Prior Publication Data

US 2013/0144927 A1 Jun. 6, 2013

(51) Int. Cl.
*G06F 7/533* (2006.01)

(52) U.S. Cl.
USPC .......................................... 708/629

(58) Field of Classification Search
None
See application file for complete search history.

(56) References Cited

U.S. PATENT DOCUMENTS

| | | | | |
|---|---|---|---|---|
| 6,012,079 | A * | 1/2000 | Song | 708/714 |
| 6,763,367 | B2 * | 7/2004 | Kwon et al. | 708/620 |
| 8,019,805 | B1 * | 9/2011 | Sarma | 708/627 |
| 2003/0069913 | A1 * | 4/2003 | Deng et al. | 708/524 |
| 2003/0158879 | A1 * | 8/2003 | Kwon et al. | 708/603 |
| 2013/0144927 | A1 * | 6/2013 | Arekapudi et al. | 708/625 |

OTHER PUBLICATIONS

Cho et al., "54×54-bit Radix-4 Multiplier based on Modified Booth Algorithm," Proceedings of the 13th ACM Great Lakes symposium on VLSI, p. 233-236 (2003).

* cited by examiner

*Primary Examiner* — David H Malzahn
(74) *Attorney, Agent, or Firm* — Volpe and Koenig, P.C.

(57) ABSTRACT

A method and apparatus are described for performing multiplication in a processor to generate a product. In one embodiment, a 64-bit multiplier and a 64-bit multiplicand may be multiplied together over four cycles by merging different partial product (PP) subsets, generated by a Booth encoder and a PP generator, with feedback sum and carry results. The logic inputs of a plurality of multiplexers may be selected on a cyclical basis to efficiently compress (i.e., merge) each PP subset with feedback sum and carry results. A pair of preliminary sum results stored during one cycle may be outputted during a subsequent cycle and processed by a logic gate (e.g., an XOR gate) to generate a feedback sum result that is merged with a feedback carry result and a PP subset. Final sum and carry results may be added to generate the product of the multiplier and the multiplicand.

20 Claims, 19 Drawing Sheets

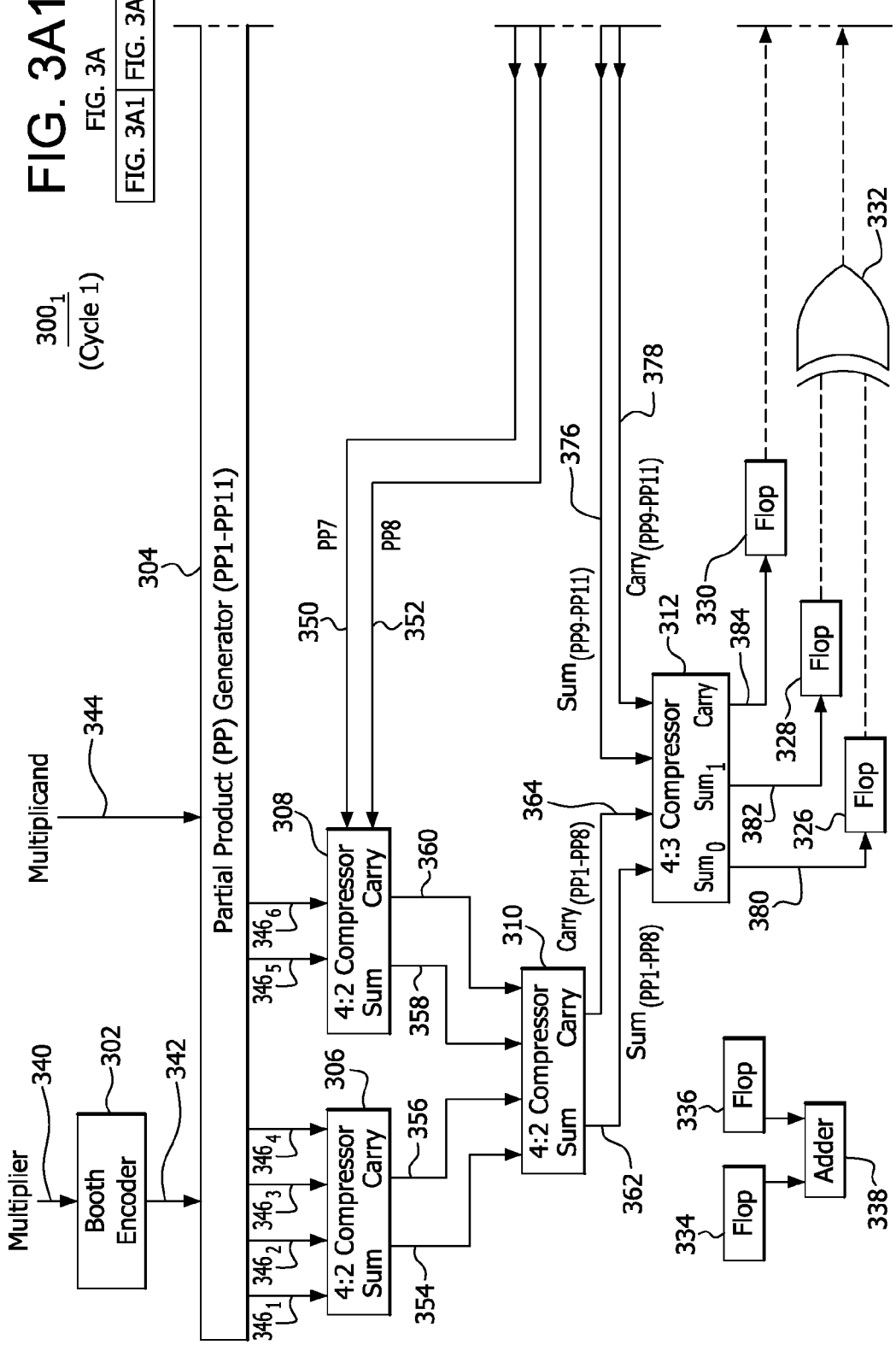

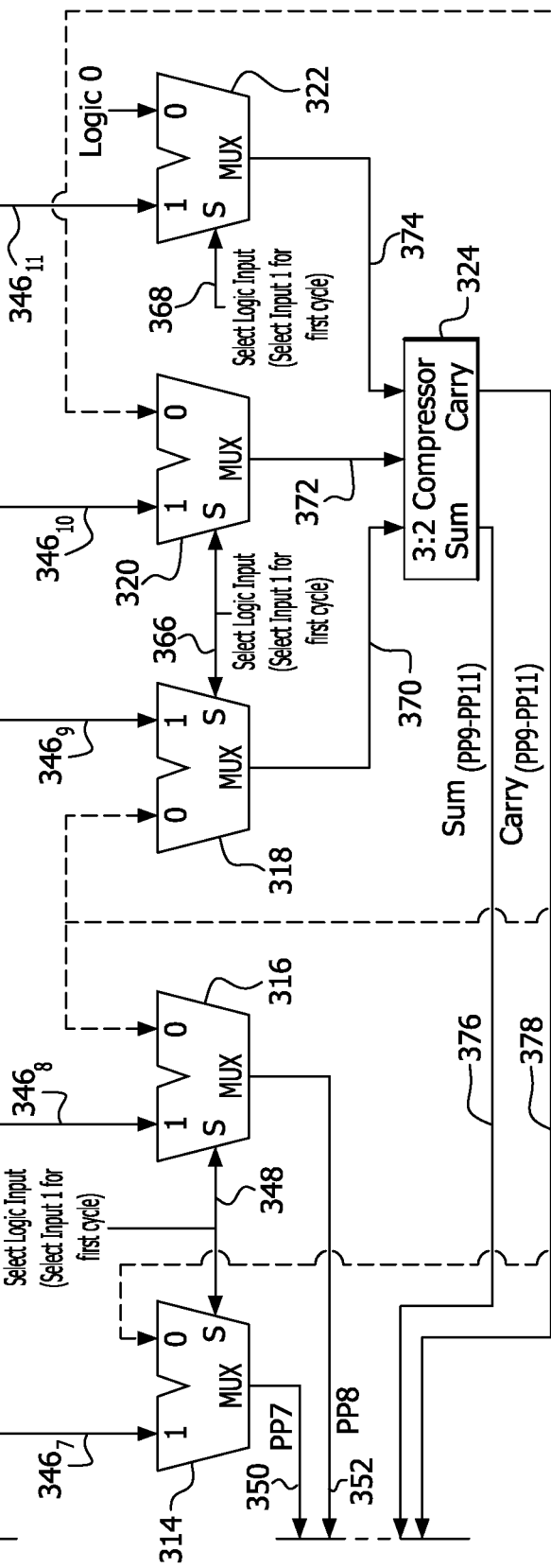

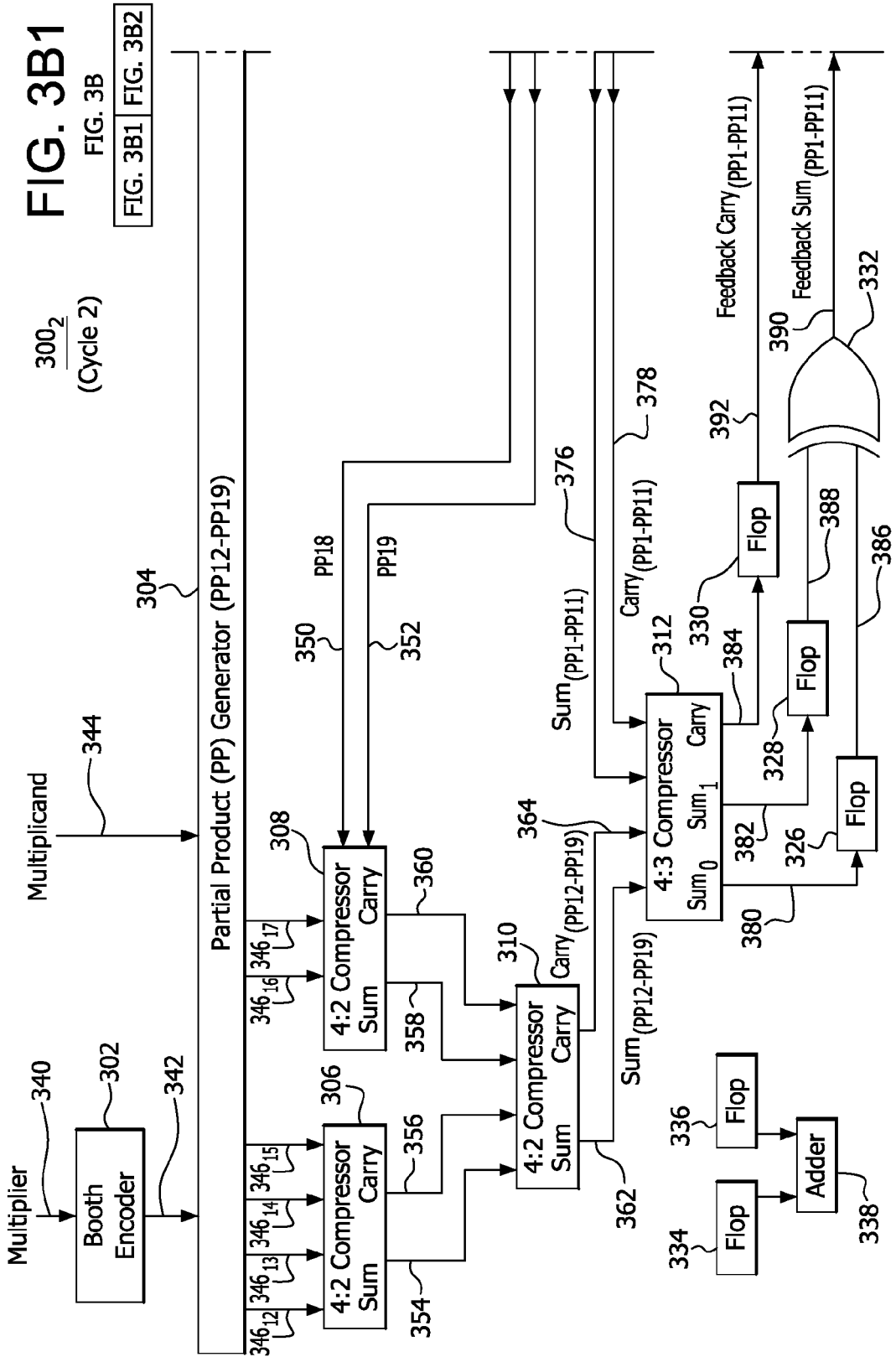

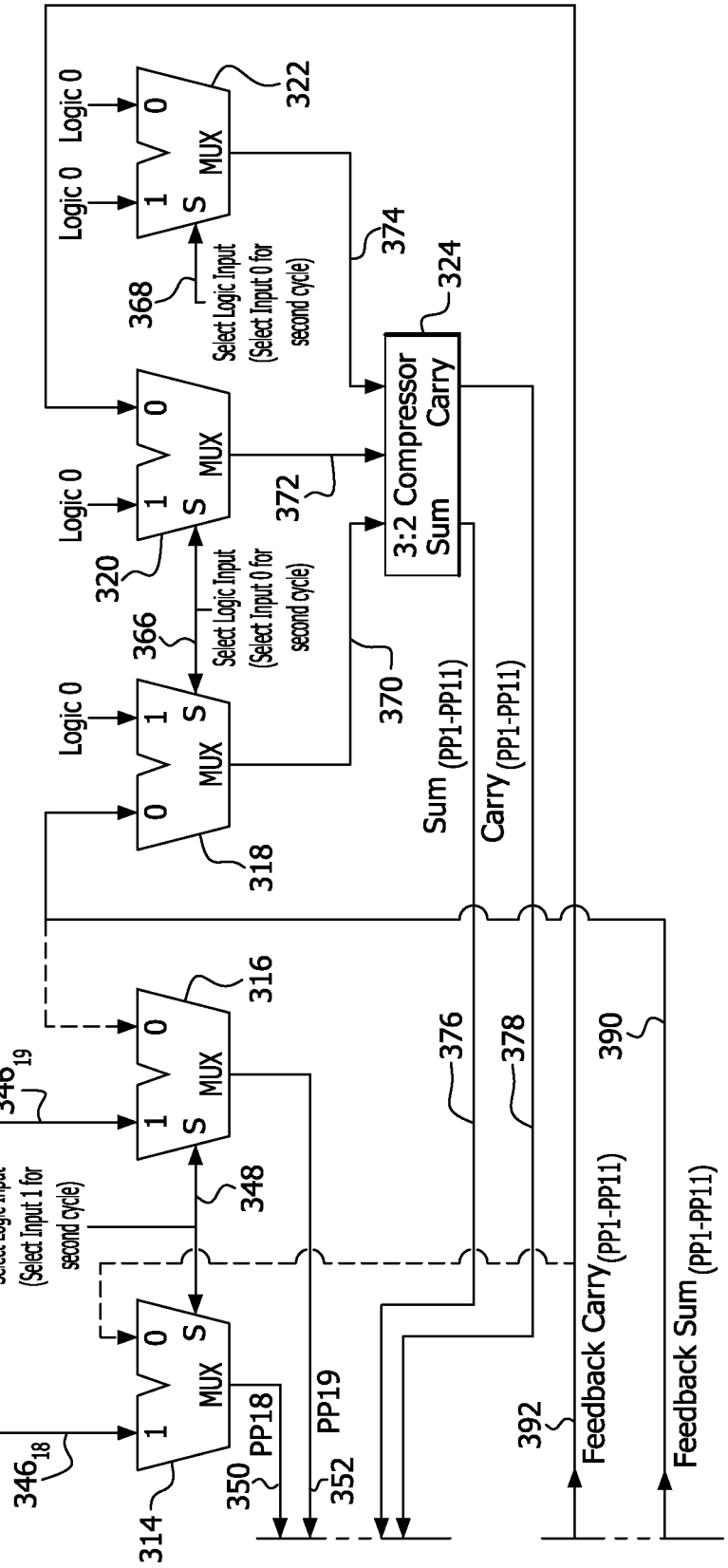

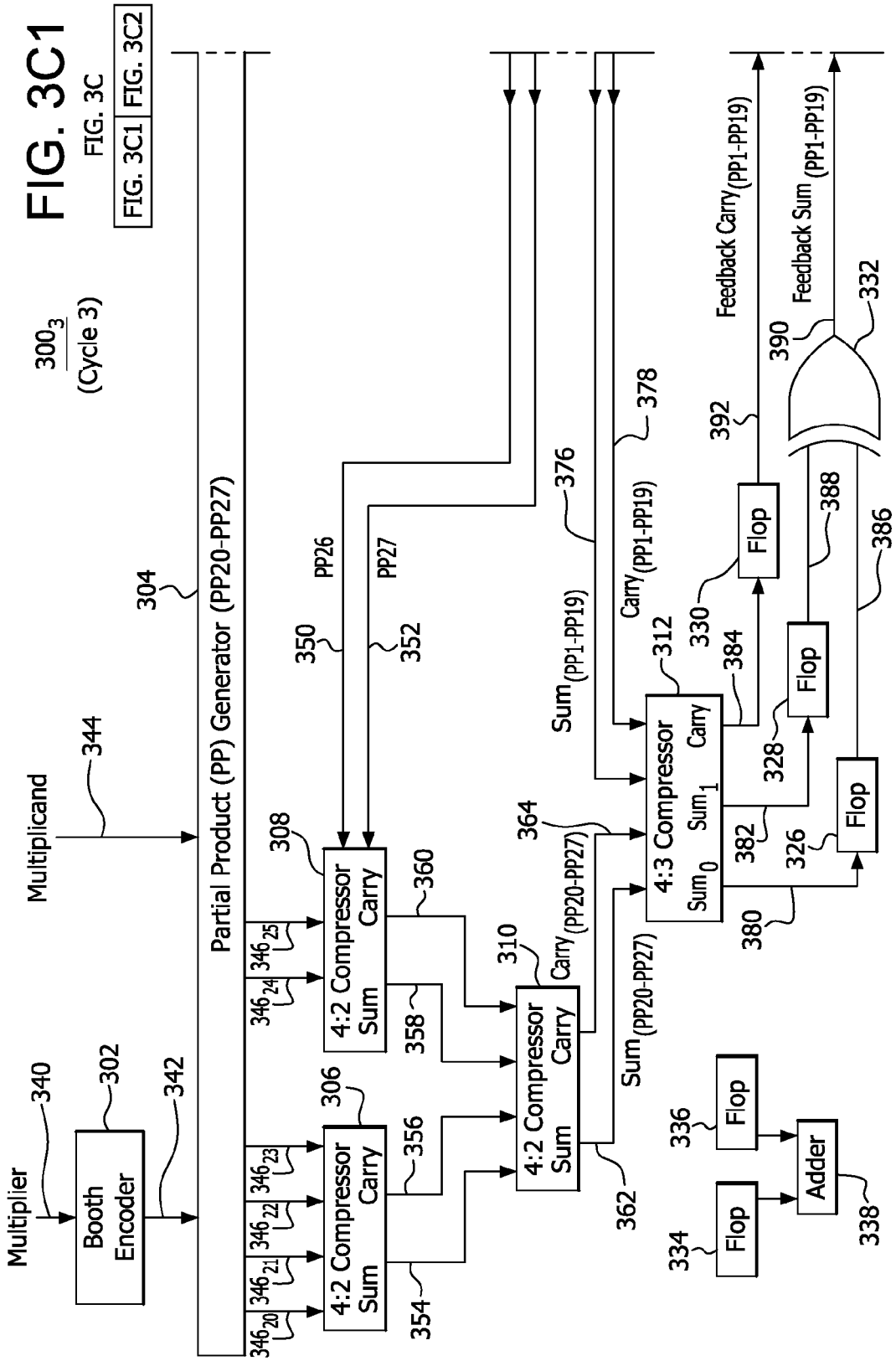
FIG. 3C1

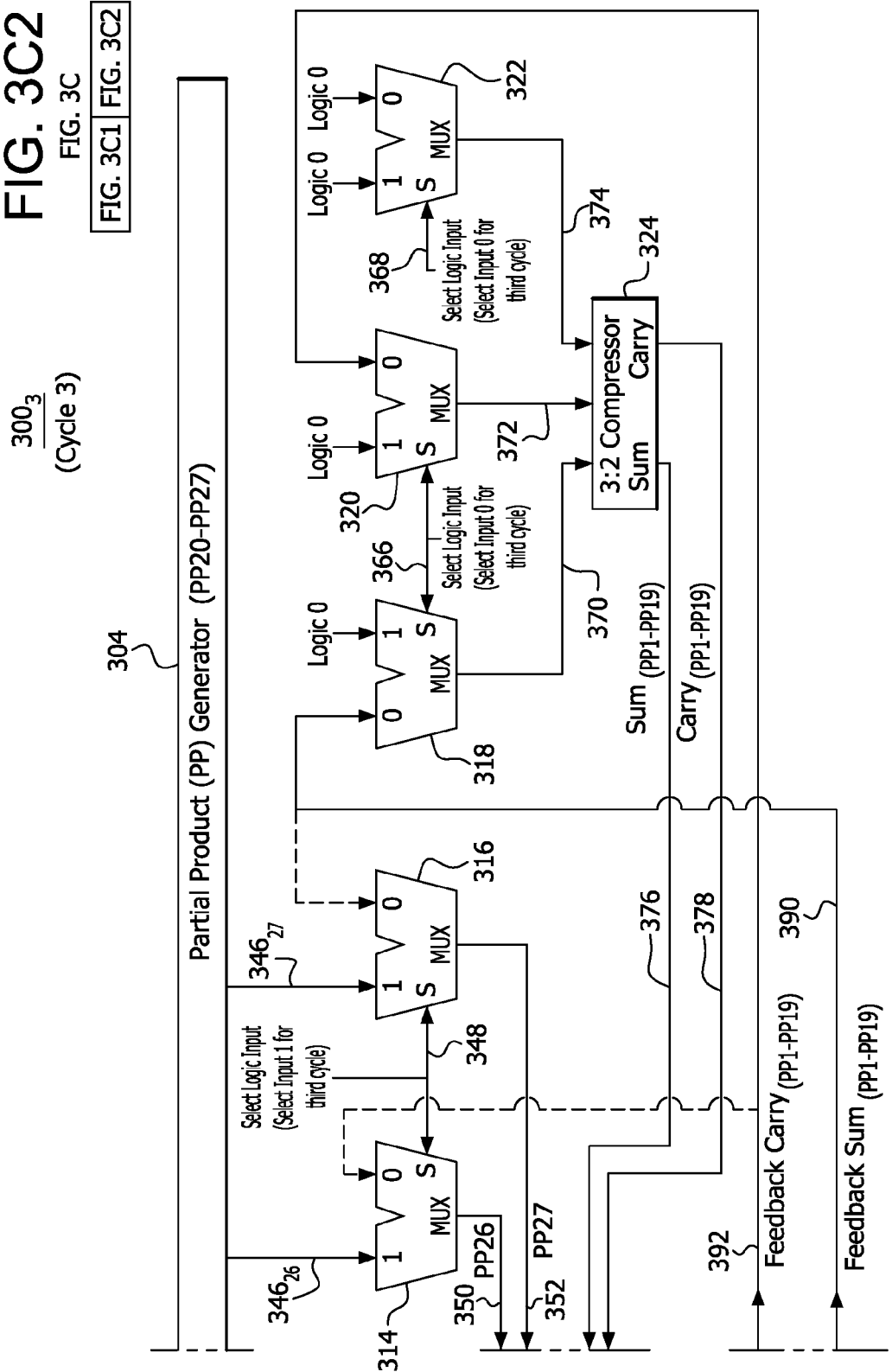

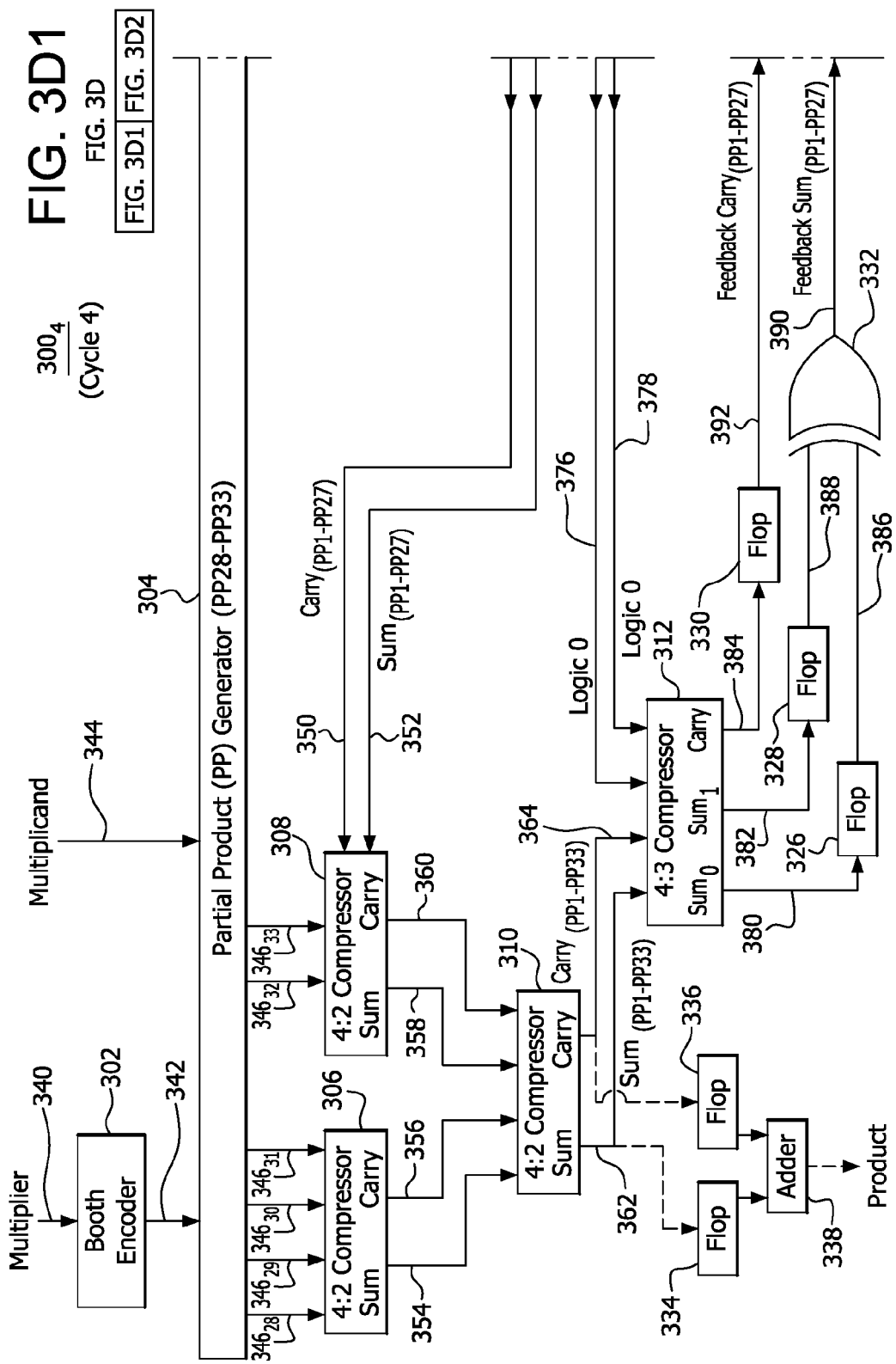

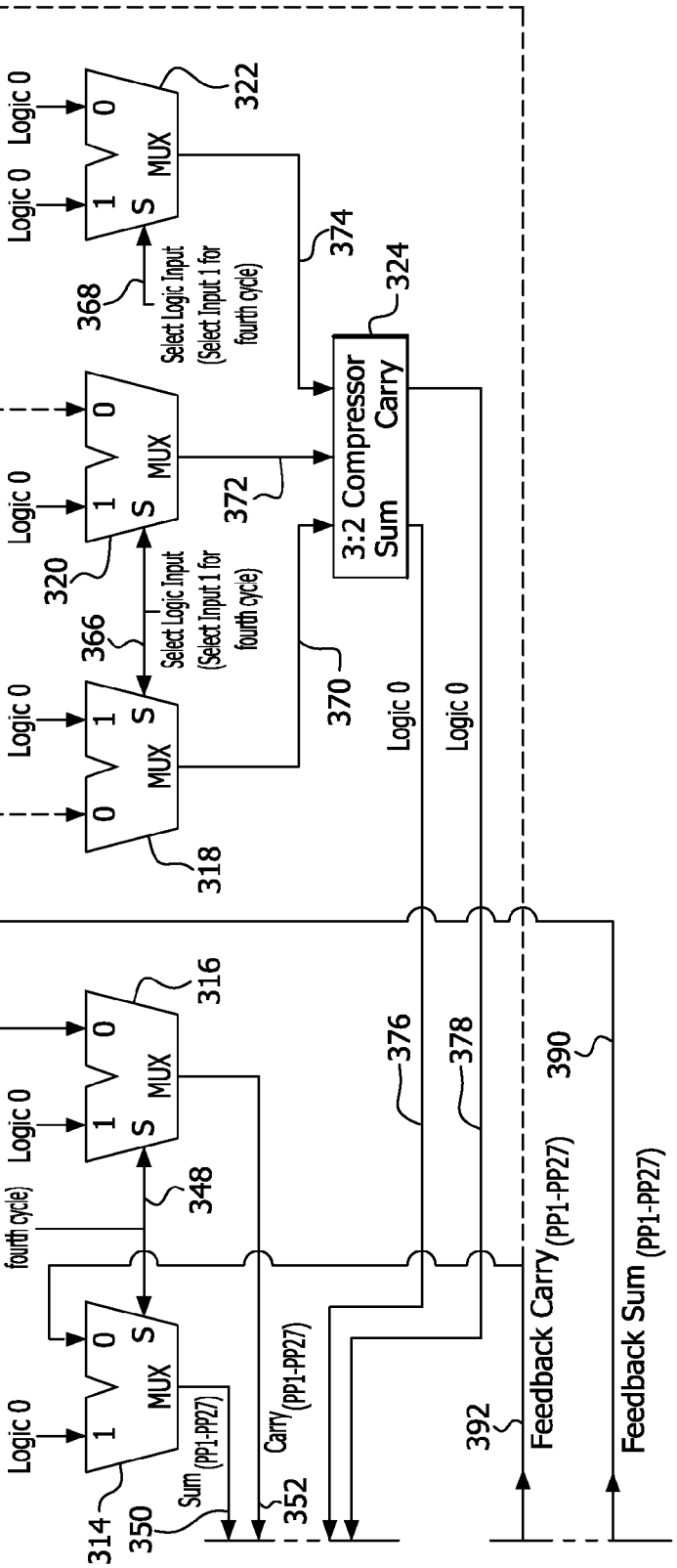

US 8,868,634 B2

METHOD AND APPARATUS FOR PERFORMING MULTIPLICATION IN A PROCESSOR

FIELD OF INVENTION

This application is related to the design of a processor.

BACKGROUND

Fast parallel multipliers are important for high speed and low power signal processing systems and much effort has been devoted to their construction. Many of today's processors, (e.g., central processing units (CPUs), graphics processing units (GPUs), and the like), include an execution (EX) unit that implements Booth's multiplication algorithm to multiply two signed binary numbers (i.e., a multiplicand and a multiplier) in two's complement notation.

A partial product (PP) is a product formed by multiplying the multiplicand by one digit of a multiplier when the multiplier has more than one digit. PPs are used as intermediate steps in calculating larger products. For example, the product of 67 and 12 may be calculated as the sum of two PPs, 134 (67×2)+670 (67×10), or 804. A usual way of multiplying a 64 bit number by a 64 bit number is to generate 33 PPs using Booth encoding and adding them together to get the final results.

In a high-performance processor, the on-chip power densities play a dominant role in both static and dynamic conditions due to shrinking device features. The consumed power is usually dissipated heat, affecting the performance and reliability of the chip. A complex multiplier is an arithmetic circuit that is extensively used by a processor. For large bit-width multiplications, (e.g., a 64-bit multiplier and a 64-bit multiplicand), a parallel multiplier circuit including a large number of compressors may be used to compress PP stages. Higher order compressors may be configured to permit the reduction of the vertical critical paths in the parallel multiplier circuit, resulting in a product that is generated in a faster and power-efficient manner.

SUMMARY OF EMBODIMENTS

A method and apparatus are described for performing multiplication in a processor to generate a product. A 64-bit multiplier and a 64-bit multiplicand may be multiplied together over four cycles by merging different partial product (PP) subsets, generated by a Booth encoder and a PP generator, with feedback sum and carry results. The logic inputs of a plurality of multiplexers may be selected on a cyclical basis to efficiently compress (i.e., merge) each PP subset with feedback sum and carry results. A pair of preliminary sum results stored during a current cycle may be outputted during a subsequent cycle and processed by a logic gate (e.g., an XOR gate) to generate a feedback sum result. A carry result stored during the current cycle may be outputted during the subsequent cycle as a feedback carry result. Then, the preliminary result is merged with the feedback carry result and a PP subset. Final sum and carry results may be added to generate the product of the multiplier and the multiplicand.

During a first cycle of the processor, a first subset of a plurality of PPs may be generated based on the multiplier and the multiplicand. A pair of preliminary sum results and a carry result obtained by merging the first subset of PPs may be stored in respective storage devices, (e.g., flops (i.e., flip-flops), latches).

During another cycle of the processor, an additional subset of the PPs may be generated based on the multiplier and the multiplicand. The pair of preliminary sum results and a feedback carry result may be output from the respective storage devices, and then the pair of preliminary sum results may be processed to generate a feedback sum result. If all of the PPs have not been generated, a pair of preliminary sum results and a carry result obtained by merging the feedback sum result, a feedback carry result and the additional subset of PPs may be stored in respective storage devices, and then the same process is repeated for yet another cycle of the processor. If all of the PPs have been generated, a final sum result and a final carry result obtained by merging the feedback sum result, the feedback carry result and the additional subset of PPs may be stored in respective storage devices, and the final sum result and the final carry result may be added to generate the product.

The processor may include a Booth encoder, a PP generator, a plurality of compressors, at least one storage device, a logic gate and an adder. The Booth encoder and the PP generator may be configured to generate a plurality of PPs based on the multiplier and the multiplicand, wherein different subsets of the PPs are generated during respective cycles of the processor. The compressors may be configured to merge each subset of the PPs to generate a pair of preliminary sum results and a carry result. The at least one storage device may be configured to store the preliminary sum results and the carry result, and output the stored preliminary sum and a feedback carry result in a subsequent cycle of the processor. The logic gate may be configured to process the preliminary sum results outputted by the at least one storage device. The at least one storage device may be further configured to store a final sum result and a final carry result obtained by the compressors merging a feedback sum result generated by the logic gate, a feedback carry result outputted by the at least one storage device, and an additional subset of the PPs. The adder may be configured to generate the product by adding a final sum result and a final carry result outputted by the at least one storage device after all of the PPs have been generated.

A computer-readable storage medium may be configured to store a set of instructions used for manufacturing a semiconductor device having the same configuration as the processor described above. The instructions may be Verilog data instructions or hardware description language (HDL) instructions.

BRIEF DESCRIPTION OF THE DRAWINGS

A more detailed understanding may be had from the following description, given by way of example in conjunction with the accompanying drawings wherein:

FIG. 3A shows an example of the operation and configuration of a processor during a first cycle of performing multiplication where 11 PPs are generated based on a multiplier and a multiplicand in accordance with a second embodiment;

FIG. 3B shows an example of the operation and configuration of the processor during a second cycle of performing multiplication where 8 PPs are generated based on the multiplier and the multiplicand in accordance with the second embodiment;

FIG. 3C shows an example of the operation and configuration of a processor during a third cycle of performing multiplication where 8 PPs are generated based on the multiplier and the multiplicand in accordance with the second embodiment;

FIG. 3D shows an example of the operation and configuration of a processor during a fourth cycle of performing multiplication where 6 PPs are generated based on the multiplier and the multiplicand in accordance with the second embodiment;

DETAILED DESCRIPTION OF EMBODIMENTS

Figure 1:
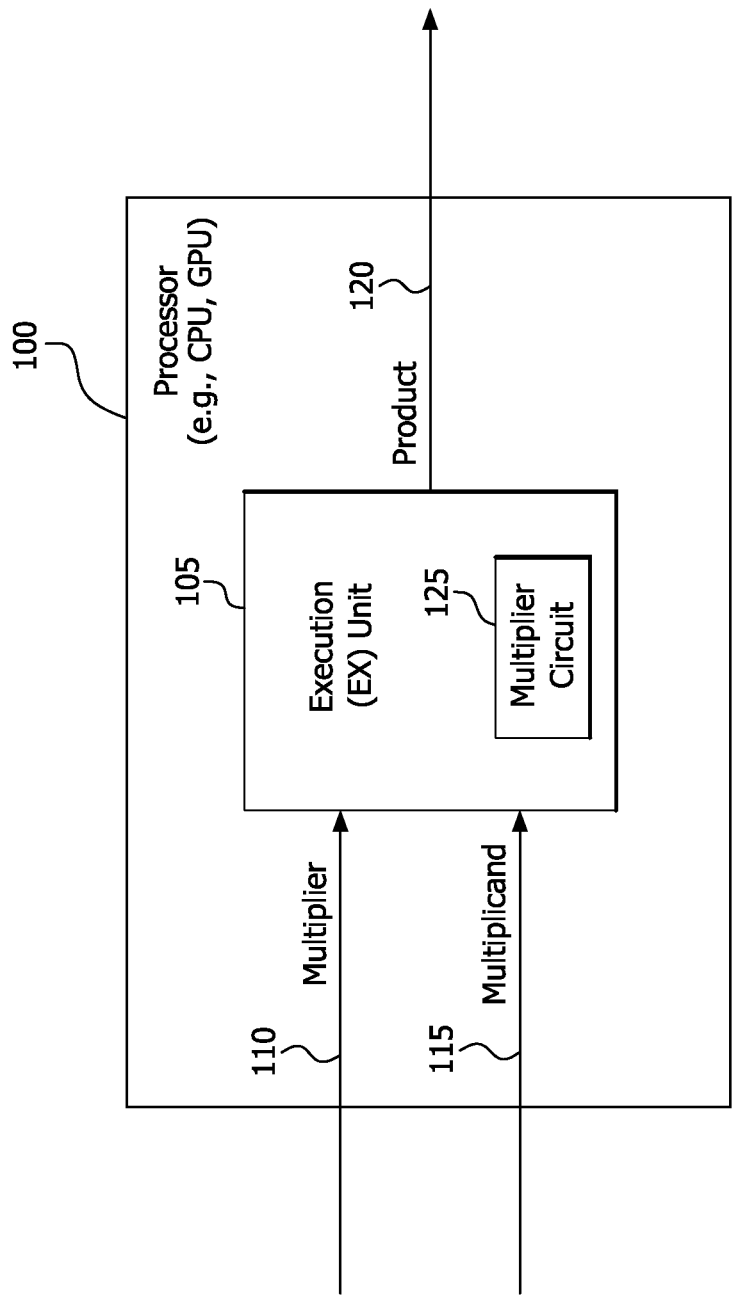
FIG. 1 shows an example block diagram of a processor (e.g., a central processing unit (CPU)) including an execution (EX) unit that is configured to perform arithmetic operations including multiplication.

FIG. 1 shows an example block diagram of a processor 100 configured to perform arithmetic operations. The processor 100 may be, for example, a CPU, a GPU and the like. The processor 100 includes an execution unit (EX) unit 105 configured to perform multiplication. A multiplier 110 and a multiplicand 115 may be input to the processor 100, or may be generated within the processor 100 itself. The EX unit 105 generates a product 120 using a multiplier circuit 125.

The embodiments described herein are directed to a method and apparatus for performing multiplication in a processor by efficiently merging a plurality of partial products (PPs) to generate a product of a multiplier and a multiplicand.

In a first embodiment, a processor merges a total of 33 PPs resulting from multiplying a 64-bit multiplier and a 64-bit multiplicand over four cycles in a "9-8-8-8" fashion. Each PP has one extra bit than the number of bits in the multiplicand, (e.g., each PP has 65 bits for this first embodiment). During a first cycle of the processor, 9 of the 33 PPs are merged using 3 levels of compressors.

In the first embodiment, a first of the compressor levels merges PPs 1-4 and 5-8 separately, and generates two sum results and two carry results, which are then merged by a second compressor level to generate a second level sum result and carry result. The second level sum result and carry result for PPs 1-8 are merged with a sum result and a carry result for PP 9 by a third level compressor. During a second cycle of the processor, a second level sum result and carry result for PPs 10-17 are merged with a sum result and a carry result for PPs 1-9. During a third cycle of the processor, a second level sum result and carry result for PPs 18-25 are merged with a sum result and a carry result for PPs 1-17. During a fourth cycle of the processor, a second level sum result and carry result for PPs 26-33 are merged with a sum result and a carry result for PPs 1-25. After all 33 PPs have been merged to generate a final sum result and a final carry result, an adder is used to generate a product of the multiplier and the multiplicand.

In a second embodiment, a processor merges a total of 33 PPs resulting from multiplying a 64-bit multiplier and a 64-bit multiplicand over four cycles in an "11-8-8-6" fashion. Each PP has one extra bit than the number of bits in the multiplicand, (e.g., each PP has 65 bits for this second embodiment). During a first cycle of the processor, 11 of the 33 PPs are merged using 3 levels of compressors. A first of the compressor levels merges PPs 1-4 and 5-8 separately, and generates two sum results and two carry results, which are then merged by a second of the compressor levels to generate a second level sum result and carry result. The first compressor level also merges a sum result and a carry result for PPs 9-11 to generate a first level sum result and carry result. The second level sum result and carry result for PPs 1-8 are merged with the first level sum result and carry result for PPs 9-11 by a third level compressor. During a second cycle of the processor, a second level sum result and carry result for PPs 12-19 are merged with a sum result and a carry result for PPs 1-11. During a third cycle of the processor, a second level sum result and carry result for PPs 20-27 are merged with a sum result and a carry result for PPs 1-19. During a fourth cycle of the processor, PPs 28-33 are merged with a sum result and a carry result for PPs 1-27. Since there are only 6 PPs in the subset, the sum result and the carry result for PPs 1-27 are fed to the first compression level, and the final sum result and the final carry result are generated by the second compressor level. An adder is then used to generate a product of the multiplier and the multiplicand.

Typically, a compressor includes a logic gate, such as an XOR gate, that combines two preliminary sum results into the compressor's sum result output. Under certain circumstances, this logic gate may cause an undesirable delay. In the second embodiment, a third level compressor, configured without the logic gate, outputs the two preliminary sum results (i.e., $S_0$ and $S1$) and a carry result to at least one storage device in sufficient time before the current processor cycle ends. During a subsequent cycle of the processor, the at least one storage device outputs the preliminary sum results to a logic gate, (e.g., an XOR gate), external to the third level compressor, which processes the preliminary sum results to generate a feedback sum result. Also during the subsequent cycle of the processor, the at least one storage device outputs a feedback carry result. The feedback sum result, the feedback carry result and a subset of the PPs are merged by the third level compressor.

Figure 2A:
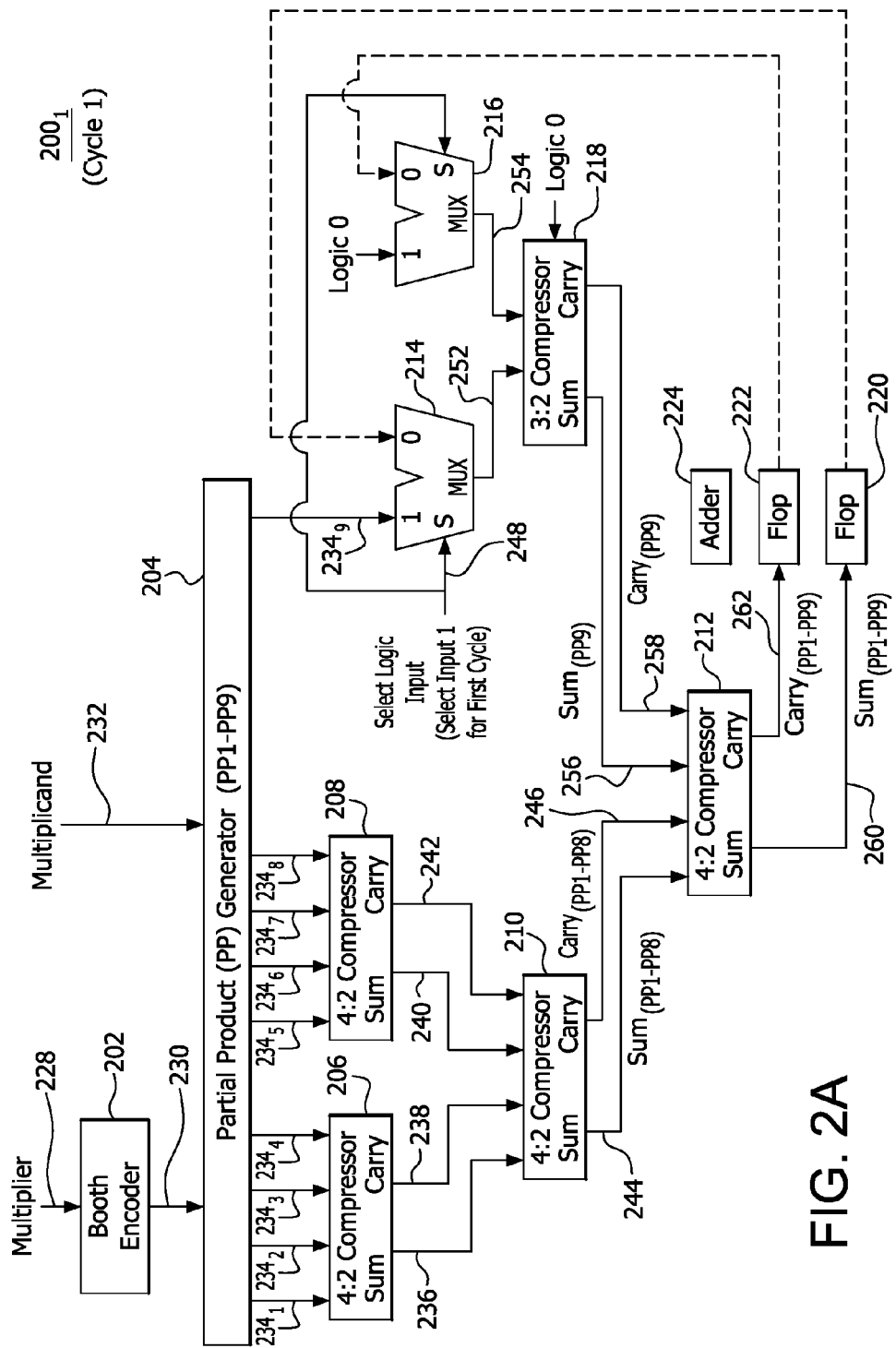
FIG. 2A shows an example of the operation and configuration of a processor during a first cycle of performing multiplication where 9 partial products (PPs) are generated based on a multiplier and a multiplicand in accordance with a first embodiment.

FIG. 2A shows an example of the operation and configuration of a processor 200 during a first cycle of performing multiplication where 9 PPs are generated based on a multiplier and a multiplicand in accordance with the first embodiment. The processor 200 includes a Booth encoder 202, a PP generator 204, first level 4:2 compressors 206 and 208, a second level 4:2 compressor 210, a third level 4:2 compressor 212, multiplexers (MUXes) 214 and 216, a 3:2 compressor 218, at least one storage device, (i.e., flops 220 and 222), and an adder 224. Each of the MUXes 214 and 216 has two selectable logic inputs (logic input 0 and logic input 1) and a single output.

As shown in FIG. 2A, the Booth encoder 202 is configured to receive a multiplier 228. An output 230 of the Booth encoder 202 and a multiplicand 232 are input to the PP generator 204, after being stored in respective flops (not shown). During a first cycle of the processor 200, (i.e., $200_1$), the PP generator 204 generates PPs $234_1$-$234_9$. The PPs $234_1$-$234_4$ are input to the 4:2 compressor 206, and the PPs $234_5$-$234_8$ are input to the 4:2 compressor 208. The PP $234_9$ is input to the logic input 1 of the MUX 214, and a logic 0 is input to the logic input 1 of the MUX 216.

The 4:2 compressor 210 is configured to receive a sum result 236 and a carry result 238 for PPs $234_1$-$234_4$ from the 4:2 compressor 206, and a sum result 240 and a carry result 242 for PPs $234_5$-$234_8$ from the 4:2 compressor 208. The 4:2 compressor 212 is configured to receive a sum result 244 and a carry result 246 for PPs $234_1$-$234_8$ from the 4:2 compressor 210. For the first cycle of the processor $200_1$, a select logic input 248 for the MUXes 214 and 216 is set to logic input 1 such that the 3:2 compressor 218 receives the PP $234_9$ via the MUX output 252 and a logic 0 via the MUX output 254. A logic 0 is also inputted into a third input of the 3:2 compressor 218. The 4:2 compressor 212 is further configured to receive a sum result 256 and a carry result 258 for PP $234_9$ from the 3:2 compressor 218, and output a sum result 260 and a carry result 262 for PPs $234_1$-$234_9$ to at least one storage device, (i.e., flops 220 and 222), which are stored until the next cycle of the processor 200 begins.

Figure 2B:
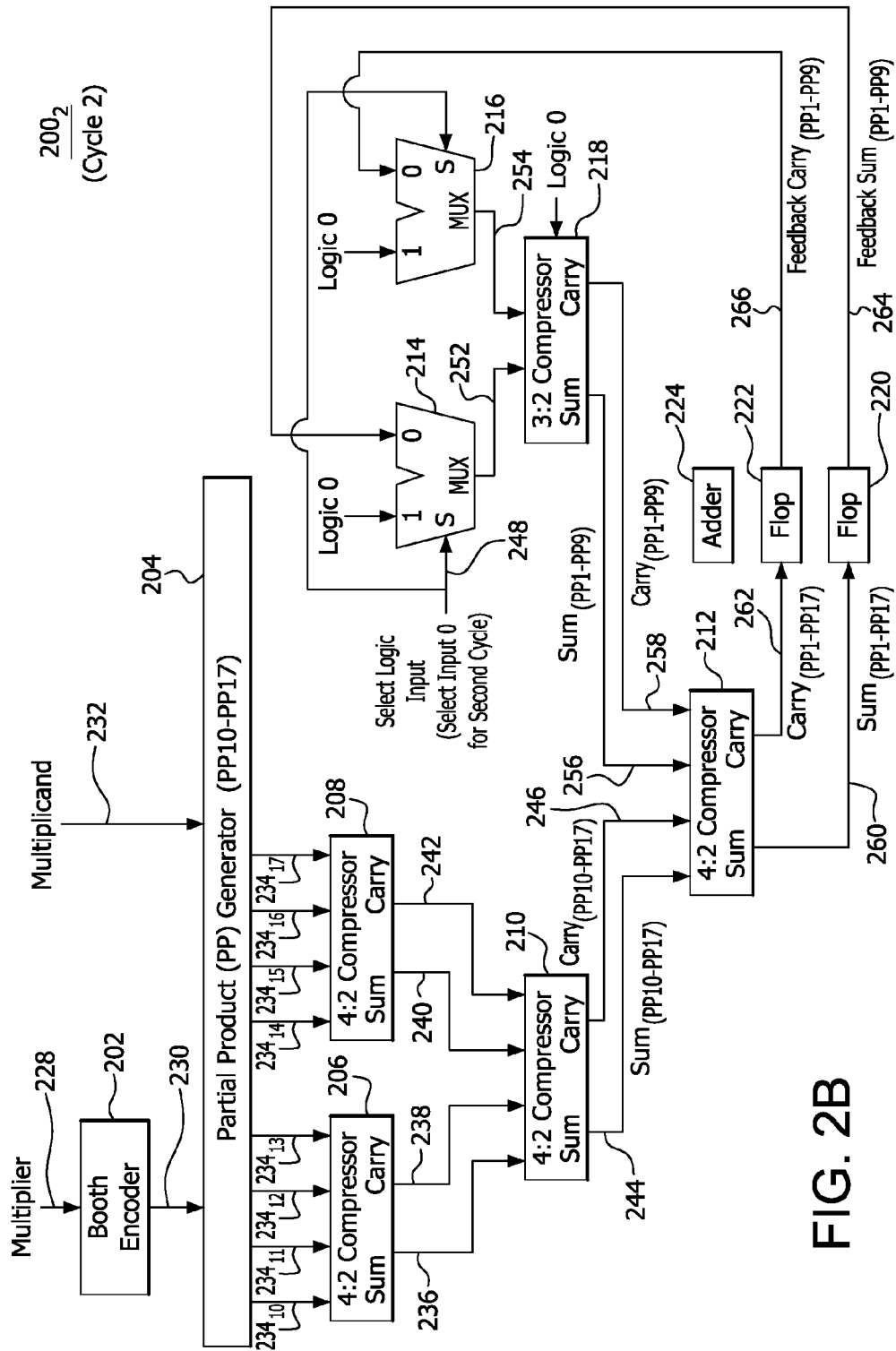
FIG. 2B shows an example of the operation and configuration of the processor during a second cycle of performing multiplication where 8 PPs are generated based on the multiplier and the multiplicand in accordance with the first embodiment.

FIG. 2B shows an example of the operation and configuration of the processor 200 during a second cycle of performing multiplication where 8 PPs are generated based on the multiplier 228 and the multiplicand 232 in accordance with the first embodiment. As shown in FIG. 2B, during a second cycle of the processor 200, (i.e., $200_2$), the PP generator 204 generates PPs $234_{10}$-$234_{17}$. PPs $234_{40}$-$234_{13}$ are input to the 4:2 compressor 206, and the PPs $234_{14}$-$234_{17}$ are input to the 4:2 compressor 208. A logic 0 is input to logic input 1 of the MUXes 214 and 216. When the second cycle begins, the flop 220 outputs to the logic input 0 of the MUX 214 a feedback sum result 264 for PPs $234_1$-$234_9$ that was stored during the first cycle, and the flop 222 outputs to the logic input 0 of the MUX 216 a feedback carry result 266 for PPs $234_1$-$234_9$ that was also stored during the first cycle.

The 4:2 compressor 210 is configured to receive a sum result 236 and a carry result 238 for PPs $234_{10}$-$234_{13}$ from the 4:2 compressor 206, and a sum result 240 and a carry result 242 for PPs $234_{14}$-$234_{17}$ from the 4:2 compressor 208. The 4:2 compressor 212 is configured to receive a sum result 244 and a carry result 246 for PPs $234_{10}$-$234_{17}$ from the 4:2 compressor 210. For the second cycle of the processor $200_2$, the select logic input 248 for the MUXes 214 and 216 is set logic input 0 such that the 3:2 compressor 218 receives the feedback sum result 264 via the MUX output 252 and the feedback carry result 266 via the MUX output 254. A logic 0 is also inputted into a third input of the 3:2 compressor 218. The 4:2 compressor 212 is further configured to receive a sum result 256 and a carry result 258 for PPs $234_1$-$234_9$ from the 3:2 compressor 218, and output a sum result 260 and a carry result 262 for PPs $234_1$-$234_{17}$ to at least one storage device, (i.e., flops 220 and 222), which are stored until the next cycle of the processor 200 begins.

Figure 2C:
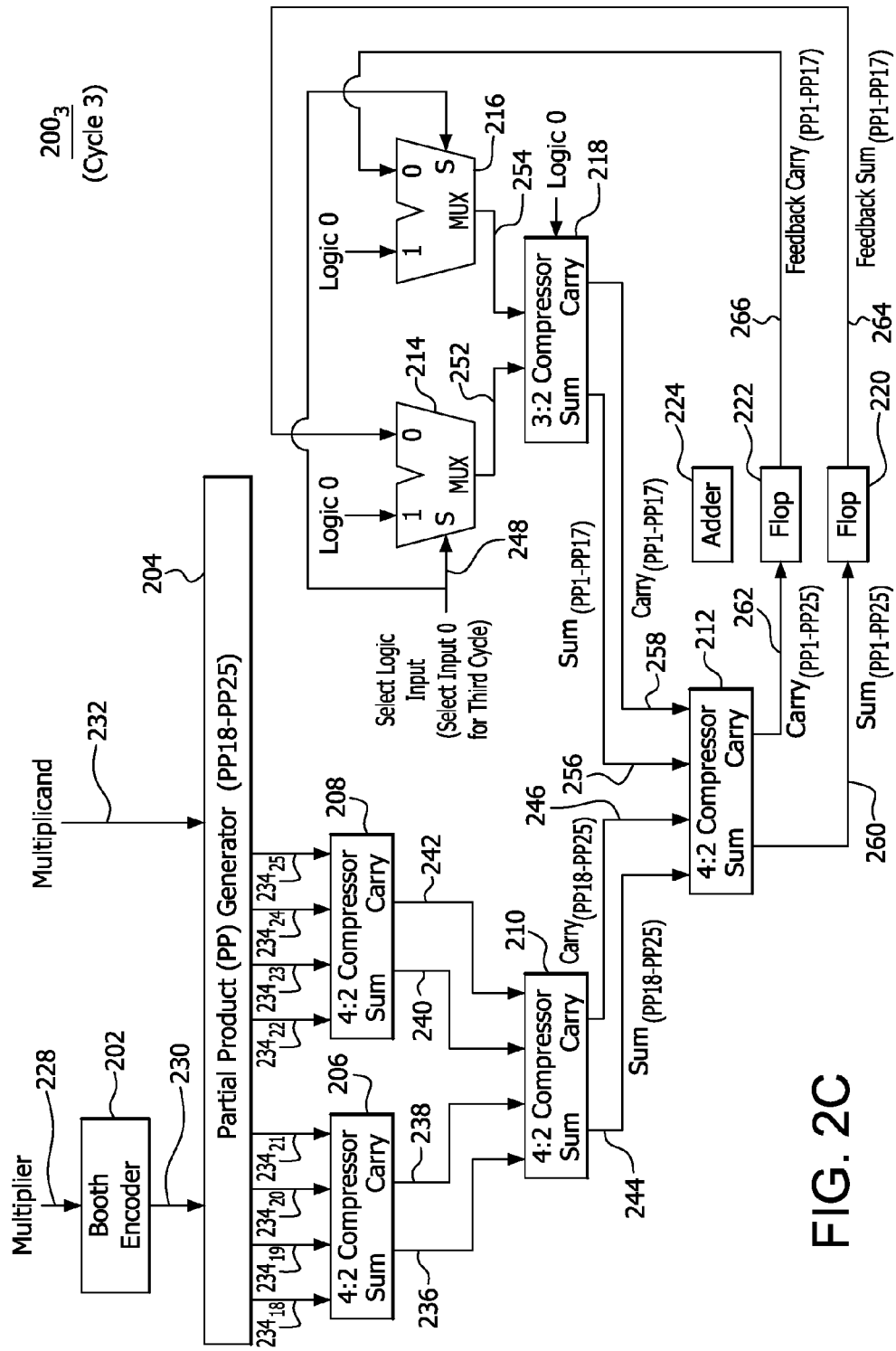
FIG. 2C shows an example of the operation and configuration of a processor during a third cycle of performing multiplication where 8 PPs are generated based on the multiplier and the multiplicand in accordance with the first embodiment.

FIG. 2C shows an example of the operation and configuration of the processor 200 during a third cycle of performing multiplication where 8 PPs are generated based on the multiplier 228 and the multiplicand 232 in accordance with the first embodiment. As shown in FIG. 2C, during a third cycle of the processor 200, (i.e., $200_3$), the PP generator 204 generates PPs $234_{18}$-$234_{25}$. PPs $234_{18}$-$234_{21}$ are input to the 4:2 compressor 206, and the PPs $234_{22}$-$234_{25}$ are input to the 4:2 compressor 208. A logic 0 is input to logic input 1 of the MUXes 214 and 216. When the third cycle begins, the flop 220 outputs to the logic input 0 of the MUX 214 a feedback sum result 264 for PPs $234_1$-$234_{17}$ that was stored during the second cycle, and the flop 222 outputs to the logic input 0 of the MUX 216 a feedback carry result 266 for PPs $234_1$-$234_{17}$ that was also stored during the second cycle.

The 4:2 compressor 210 is configured to receive a sum result 236 and a carry result 238 for PPs $234_{18}$-$234_{21}$ from the 4:2 compressor 206, and a sum result 240 and a carry result 242 for PPs $234_{22}$-$234_{25}$ from the 4:2 compressor 208. The 4:2 compressor 212 is configured to receive a sum result 244 and a carry result 246 for PPs $234_{18}$-$234_{25}$ from the 4:2 compressor 210. For the third cycle of the processor $200_3$, the select logic input 248 for the MUXes 214 and 216 is set logic input 0 such that the 3:2 compressor 218 receives the feedback sum result 264 via the MUX output 252 and the feedback carry result 266 via the MUX output 254. A logic 0 is also inputted into a third input of the 3:2 compressor 218. The 4:2 compressor 212 is further configured to receive a sum result 256 and a carry result 258 for PPs $234_1$-$234_{17}$ from the 3:2 compressor 218, and output a sum result 260 and a carry result 262 for PPs $234_1$-$234_{25}$ to at least one storage device, (i.e., flops 220 and 222), which are stored until the next cycle of the processor 200 begins.

Figure 2D:
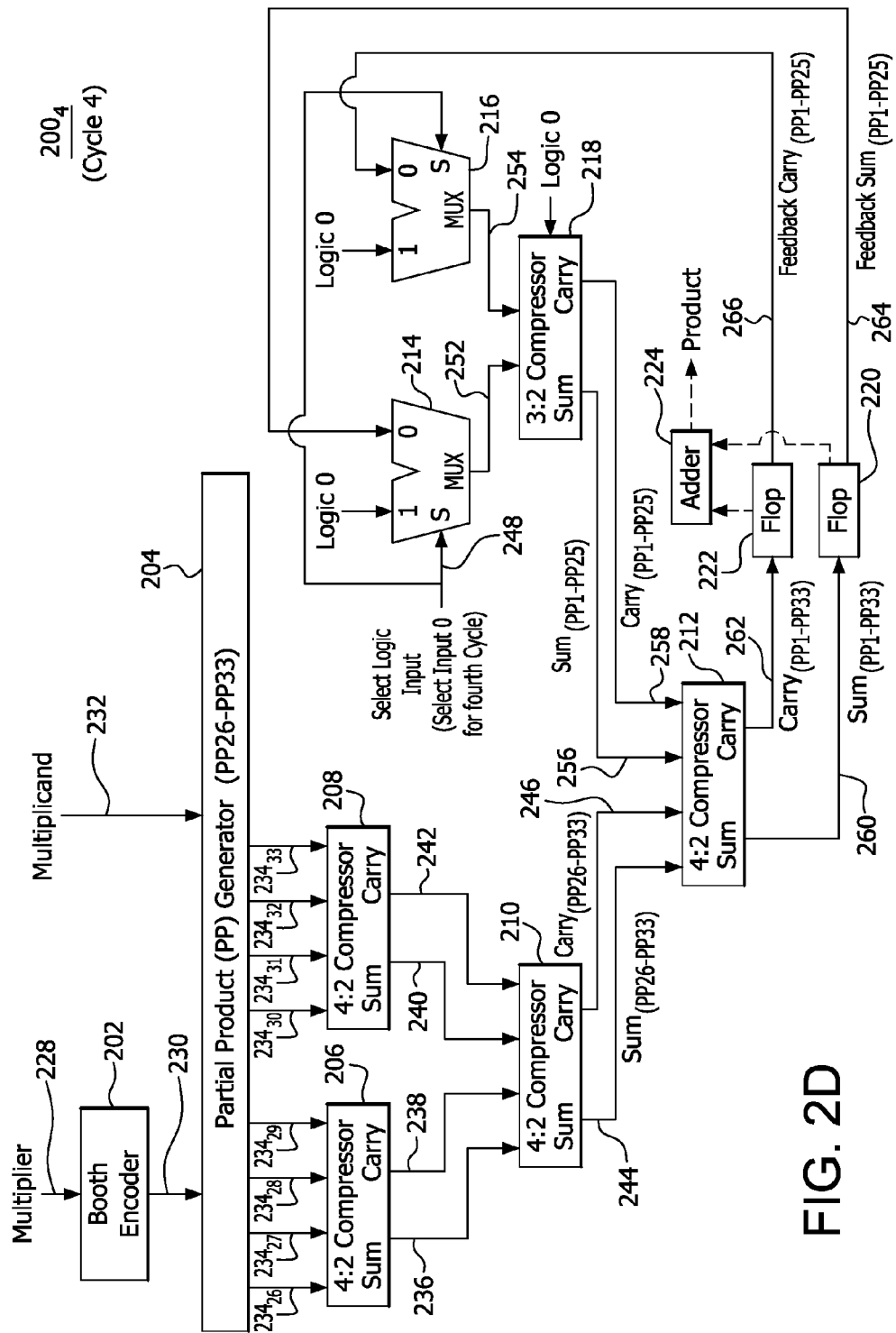
FIG. 2D shows an example of the operation and configuration of a processor during a fourth cycle of performing multiplication where 8 PPs are generated based on the multiplier and the multiplicand in accordance with a first embodiment.

FIG. 2D shows an example of the operation and configuration of the processor 200 during a fourth cycle of performing multiplication where 8 PPs are generated based on the multiplier 228 and the multiplicand 232 in accordance with the first embodiment. As shown in FIG. 2D, during a fourth cycle of the processor 200, (i.e., $200_4$), the PP generator 204 generates PPs $234_{26}$-$234_{33}$. PPs $234_{26}$-$234_{29}$ are input to the 4:2 compressor 206, and the PPs $234_{30}$-$234_{33}$ are input to the 4:2 compressor 208. A logic 0 is input to logic input 1 of the MUXes 214 and 216. When the fourth cycle begins, the flop 220 outputs to the logic input 0 of the MUX 214 the feedback sum result 264 for PPs $234_1$-$234_{25}$ that was stored during the third cycle, and the flop 222 outputs to the logic input 0 of the MUX 216 the feedback carry result 266 for PPs $234_1$-$234_{25}$ that was also stored during the third cycle.

The 4:2 compressor 210 is configured to receive a sum result 236 and a carry result 238 for PPs $234_{26}$-$234_{29}$ from the 4:2 compressor 206, and a sum result 240 and a carry result 242 for PPs $234_{30}$-$234_{33}$ from the 4:2 compressor 208. The 4:2 compressor 212 is configured to receive a sum result 244 and a carry result 246 for PPs $234_{26}$-$234_{33}$ from the 4:2 compressor 210. For the fourth cycle of the processor $200_4$, the select logic input 248 for the MUXes 214 and 216 is set logic input 0 such that the 3:2 compressor 218 receives the feedback sum result 264 via the MUX output 252 and the feedback carry result 266 via the MUX output 254. A logic 0 is also inputted into a third input of the 3:2 compressor 218. The 4:2 compressor 212 is further configured to receive a sum result 256 and a carry result 258 for PPs $234_1$-$234_{25}$ from the 3:2 compressor 218, and output a sum result 260 and a carry result 262 for PPs $234_1$-$234_{33}$ to at least one storage device, (i.e., flops 220 and 222), which are stored until the next cycle of the processor 200 begins before being outputted to the adder 224.

Figure 2E:
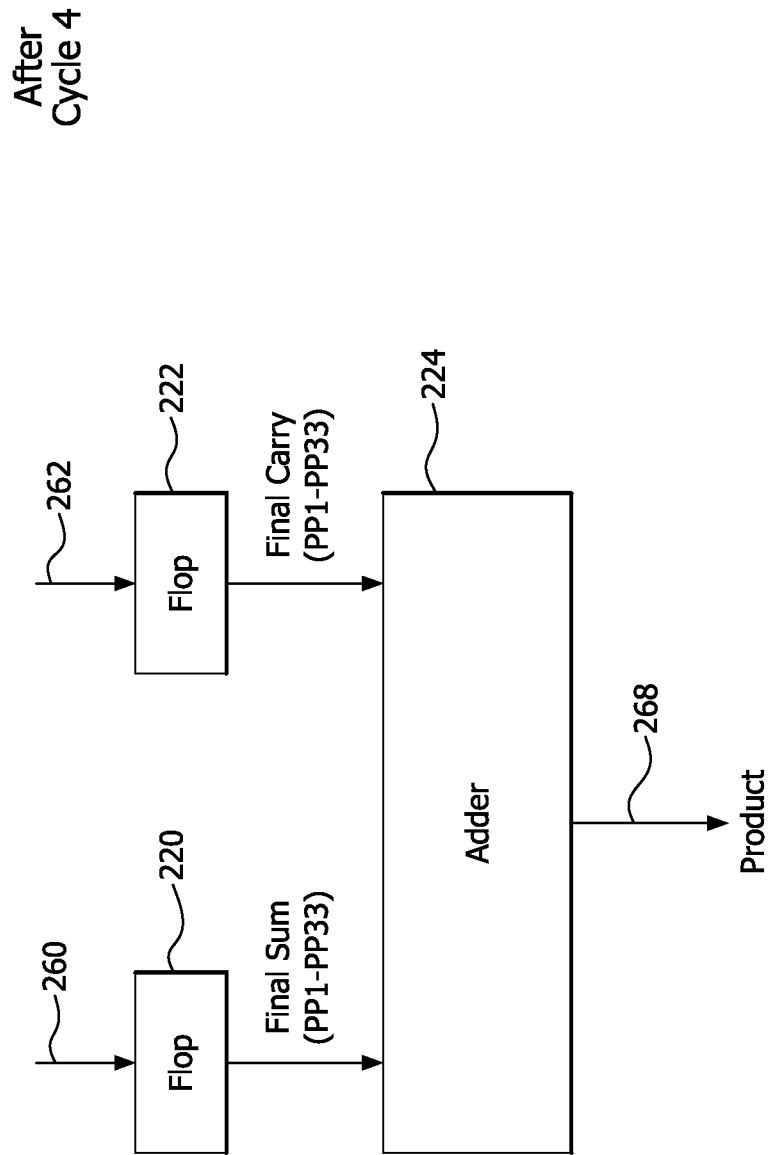
FIG. 2E shows an example of adding a final sum and final carry generated by a processor after all PPs are generated, (i.e., after the processor operates over the four cycles as illustrated by FIGS. 2A-2D), resulting in the generation of a product of the multiplier and the multiplicand in accordance with the first embodiment.

FIG. 2E shows an example of the adder 224 adding a final sum result and a final carry result generated by the processor 200 after all of the PPs $234_1$-$234_{33}$ are generated, (i.e., after the processor 200 operates over the four cycles as illustrated by FIGS. 2A-2D), resulting in the generation of a product 268 of the multiplier 228 and the multiplicand 232.

FIG. 3A shows an example of the operation and configuration of a processor 300 during a first cycle of performing multiplication where 11 PPs are generated based on a multiplier and a multiplicand in accordance with a second embodiment. The processor 300 includes a Booth encoder 302, a PP generator 304, first level 4:2 compressors 306 and 308, a second level 4:2 compressor 310, a third level 4:3 compressor 312, MUXes 314, 316, 318, 320 and 322, a 3:2 compressor 324, flops 326, 328 and 330, an XOR gate 332, flops 334 and 336, and an adder 338. Each of the MUXes 314, 316, 318, 320 and 322 has two selectable logic inputs (logic input 1 and logic input 0) and a single output.

As shown in FIG. 3A, the Booth encoder 302 is configured to receive a multiplier 340. An output 342 of the Booth encoder 302 and a multiplicand 344 are input to the PP generator 304, after being stored in respective flops (not shown). During a first cycle of the processor 300, (i.e., $300_1$), the PP generator 304 generates PPs $346_1$-$346_{11}$. The PPs $346_1$-$346_4$ are input to the 4:2 compressor 306, and the PPs $346_5$ and $346_6$ are input to the 4:2 compressor 308. The PP $346_7$ is input to the logic input 1 of the MUX 314, the PP $346_8$ is input to the logic input 1 of the MUX 316, the PP $346_9$ is input to the logic input 1 of the MUX 318, the PP $346_{10}$ is input to the logic input 1 of the MUX 320, the PP $346_{11}$ is input to the logic input 1 of the MUX 322, and a logic 0 is input to the logic input 0 of the MUX 322.

For the first cycle of the processor $300_1$, a select logic input 348 for the MUXes 314 and 316 is set to logic input 1 such that the 4:2 compressor 308 receives the PP $346_7$ via the MUX output 350 and receives the PP $346_8$ via the MUX output 352.

The 4:2 compressor 310 is configured to receive a sum result 354 and a carry result 356 for PPs $346_1$-$346_4$ from the 4:2 compressor 306, and a sum result 358 and a carry result 360 for PPs $346_5$-$346_8$ from the 4:2 compressor 308. The 4:3 compressor 312 is configured to receive a sum result 362 and a carry result 364 for the PPs $346_1$-$346_8$ from the 4:2 compressor 310. For the first cycle of the processor $300_1$, a select logic input 366 for the MUXes 318 and 320, and a select logic input 368 for the MUX 322, are set to logic input 1 such that the 3:2 compressor 324 receives the PP $346_9$ via the MUX output 370, receives the PP $346_{10}$ via the MUX output 372, and receives the PP $346_{11}$ via the MUX output 374.

The 4:3 compressor 312 is further configured to receive a sum result 376 and a carry result 378 for the PPs $346_9$-$346_{11}$ from the 3:2 compressor 324, and output a first preliminary sum result 380 (i.e., $S_0$), a second preliminary sum result 382 (i.e., $S_1$) and a carry result 384 for PPs $346_1$-$346_{11}$ to at least one storage device, (i.e., flops 326, 328 and 330), which are stored until the next cycle of the processor 300 begins.

FIG. 3B shows an example of the operation and configuration of the processor 300 during a second cycle of performing multiplication where 8 PPs are generated based on the multiplier 340 and the multiplicand 344 in accordance with the second embodiment. During a second cycle of the processor 300, (i.e., $300_2$), the PP generator 304 generates PPs $346_{42}$-$346_{49}$. The PPs $346_{42}$-$346_{45}$ are input to the 4:2 compressor 306, and the PPs $346_{46}$ and $346_{47}$ are input to the 4:2 compressor 308. The PP $346_{48}$ is input to the logic input 1 of the MUX 314, and the PP $346_{49}$ is input to the logic input 1 of the MUX 316.

When the second cycle begins, the flop 326 outputs to a logical gate, (i.e., the XOR gate 332), a first preliminary sum result 386 for the PPs $346_1$-$346_{11}$ that was stored during the first cycle, and the flop 328 outputs to the XOR gate 332 a second preliminary sum result 388 for the PPs $346_1$-$346_{11}$ that was also stored during the first cycle. The XOR gate 332 processes the first preliminary sum result 386 and the second preliminary sum result 388 to generate a feedback sum result 390 for the PPs $346_1$-$346_{11}$, which is input to the logic 0 input of the MUX 318. Furthermore, the flop 330 outputs a feedback carry result 392 for the PPs $346_1$-$346_{11}$ that was also stored during the first cycle, which is input to the logic 0 input of the MUX 320. A logic 0 is input to the logic 1 inputs of the MUXes 318, 320 and 322, and the logic 0 input of the MUX 322.

For the second cycle of the processor $300_2$, the select logic input 348 for the MUXes 314 and 316 is set to logic input 1 such that the 4:2 compressor 308 receives the PP $346_{18}$ via the MUX output 350 and receives the PP $346_{19}$ via the MUX output 352.

The 4:2 compressor 310 is configured to receive a sum result 354 and a carry result 356 for PPs $346_{12}$-$346_{15}$ from the 4:2 compressor 306, and a sum result 358 and a carry result 360 for PPs $346_{16}$-$346_{19}$ from the 4:2 compressor 308. The 4:3 compressor 312 is configured to receive a sum result 362 and a carry result 364 for the PPs $346_{12}$-$346_{19}$ from the 4:2 compressor 310. For the second cycle of the processor $300_2$, the select logic input 366 for the MUXes 318 and 320, and the select logic input 368 for the MUX 322, are set to logic input 0 such that the 3:2 compressor 324 receives the feedback sum result 390 for the PPs $346_1$-$346_{11}$ via the MUX output 370, receives the feedback carry result 392 for the PPs $346_1$-$346_{11}$ via the MUX output 372, and receives a logic 0 via the MUX output 374.

The 4:3 compressor 312 is further configured to receive a sum result 376 and a carry result 378 for the PPs $346_1$-$346_{11}$ from the 3:2 compressor 324, and output a first preliminary sum result 380, a second preliminary sum result 382 and a carry result 384 for the PPs $346_1$-$346_{19}$ to at least one storage device, (i.e., flops 326, 328 and 330), which are stored until the next cycle of the processor 300 begins.

FIG. 3C shows an example of the operation and configuration of the processor 300 during a third cycle of performing multiplication where 8 PPs are generated based on the multiplier 340 and the multiplicand 344 in accordance with the second embodiment. During a third cycle of the processor 300, (i.e., $300_3$), the PP generator 304 generates PPs $346_{20}$-$346_{27}$. The PPs $346_{20}$-$346_{23}$ are input to the 4:2 compressor 306, and the PPs $346_{24}$ and $346_{25}$ are input to the 4:2 compressor 308. The PP $346_{26}$ is input to the logic input 1 of the MUX 314, and the PP $346_{27}$ is input to the logic input 1 of the MUX 316.

When the third cycle begins, the flop 326 outputs to a logical gate, (i.e., the XOR gate 332), a first preliminary sum result 386 for the PPs $346_1$-$346_{19}$ that was stored during the second cycle, and the flop 328 outputs to the XOR gate 332 a second preliminary sum result 388 for the PPs $346_1$-$346_{19}$ that was also stored during the second cycle. The XOR gate 332 processes the first preliminary sum result 386 and the second preliminary sum result 388 to generate a feedback sum result 390 for the PPs $346_1$-$346_{11}$, which is input to the logic 0 input of the MUX 318. Furthermore, the flop 330 outputs a feedback carry result 392 for the PPs $346_1$-$346_{19}$ that was also stored during the second cycle, which is input to the logic 0 input of the MUX 320. A logic 0 is input to the logic 1 inputs of the MUXes 318, 320 and 322, and the logic 0 input of the MUX 322.

For the third cycle of the processor $300_3$, the select logic input 348 for the MUXes 314 and 316 is set to logic input 1 such that the 4:2 compressor 308 receives the PP $346_{26}$ via the MUX output 350 and receives the PP $346_{27}$ via the MUX output 352.

The 4:2 compressor 310 is configured to receive a sum result 354 and a carry result 356 for PPs $346_{20}$-$346_{23}$ from the 4:2 compressor 306, and a sum result 358 and a carry result 360 for PPs $346_{24}$-$346_{27}$ from the 4:2 compressor 308. The 4:3 compressor 312 is configured to receive a sum result 362 and a carry result 364 for the PPs $346_{20}$-$346_{27}$ from the 4:2 compressor 310. For the third cycle of the processor $300_3$, the select logic input 366 for the MUXes 318 and 320, and the select logic input 368 for the MUX 322, are set to logic input 0 such that the 3:2 compressor 324 receives the feedback sum result 390 for the PPs $346_1$-$346_{19}$ via the MUX output 370, receives the feedback carry result 392 for the PPs $346_1$-$346_{19}$ via the MUX output 372, and receives a logic 0 via the MUX output 374.

The 4:3 compressor 312 is further configured to receive a sum result 376 and a carry result 378 for the PPs $346_1$-$346_{19}$ from the 3:2 compressor 324, and output a first preliminary sum result 380, a second preliminary sum result 382 and a carry result 384 for the PPs $346_1$-$346_{27}$ to at least one storage device, (i.e., flops 326, 328 and 330), which are stored until the next cycle of the processor 300 begins.

FIG. 3D shows an example of the operation and configuration of the processor 399 during a fourth cycle of performing multiplication where 6 PPs are generated based on the multiplier 340 and the multiplicand 344 in accordance with the second embodiment. During a fourth cycle of the processor 300, (i.e., $300_4$), the PP generator 304 generates PPs $346_{28}$-$346_{33}$. The PPs $346_{28}$-$346_{31}$ are input to the 4:2 compressor 306, and the PPs $346_{32}$ and $346_{33}$ are input to the 4:2 compressor 308.

When the fourth cycle begins, the flop 326 outputs to a logical gate, (i.e., the XOR gate 332), a first preliminary sum result 386 for the PPs $346_1$-$346_{27}$ that was stored during the third cycle, and the flop 328 outputs to the XOR gate 332 a second preliminary sum result 388 for the PPs $346_1$-$346_{27}$ that was also stored during the third cycle. The XOR gate 332 processes the first preliminary sum result 386 and the second preliminary sum result 388 to generate a feedback sum result 390 for the PPs $346_1$-$346_{27}$, which is input to the logic 0 input of the MUX 316. Furthermore, the flop 330 outputs a feedback carry result 392 for the PPs $346_1$-$346_{27}$ that was also stored during the third cycle, which is input to the logic 0 input of the MUX 314. A logic 0 is input to the logic 1 inputs of the MUXes 314, 316, 318, 320 and 322, and the logic 0 input of the MUX 322.

For the fourth cycle of the processor $300_4$, the select logic input 348 for the MUXes 314 and 316 is set to logic input 0 such that the 4:2 compressor 308 receives the feedback sum result for the PPs $346_1$-$346_{27}$ via the MUX output 350 and receives the feedback carry result for the PPs $346_1$-$346_{27}$ via the MUX output 352.

The 4:2 compressor 310 is configured to receive a sum result 354 and a carry result 356 for PPs $346_{28}$-$346_{31}$ from the 4:2 compressor 306, and a sum result 358 and a carry result 360 for PPs $346_1$-$346_{27}$, $346_{32}$ and $346_{33}$ from the 4:2 compressor 308, and to output the sum result and carry result for PPs $346_1$-$346_{33}$ to at least one storage device, (i.e., flops 334 and 336 or, alternatively, flops 326 and 330), which are stored until the next cycle of the processor 300 begins before being outputted to the adder 338.

Figure 3E:
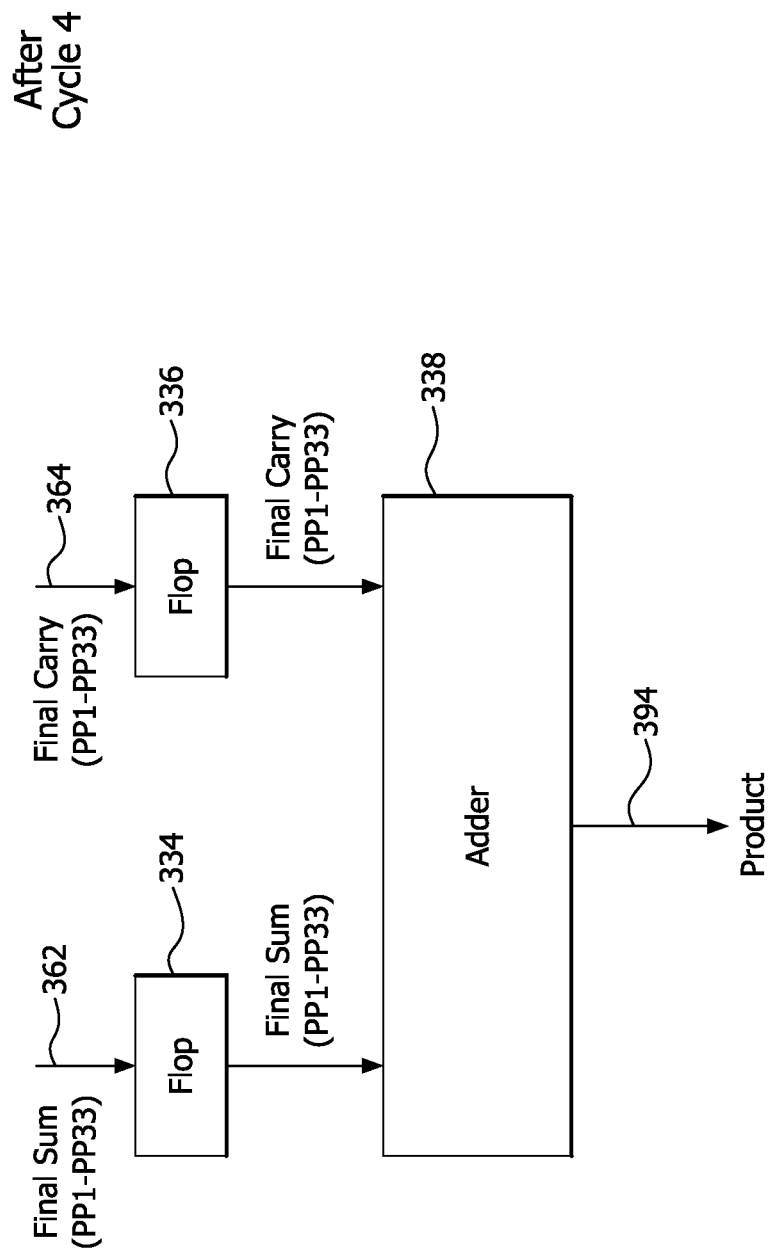
FIG. 3E shows an example of adding a final sum and final carry generated by a processor after all PPs are generated, (i.e., after the processor operates over the four cycles as illustrated by FIGS. 3A-3D), resulting in the generation of a product of the multiplier and the multiplicand in accordance with the second embodiment.

FIG. 3E shows an example of the adder 338 adding a final sum result and a final carry result generated by the processor 300 after all of the PPs $346_1$-$346_{33}$ are generated, (i.e., after the processor 300 operates over the four cycles as illustrated by FIGS. 3A-3D), resulting in the generation of a product 394 of the multiplier 340 and the multiplicand 344. Although FIGS. 3D and 3E show the adder 338 receiving the final sum and carry results from the respective flops 334 and 336, flops 326 and 330 may be used instead.

Although the first and second embodiments described above are applicable to multiplying a 64-bit multiplier and a 64-bit multiplicand over four cycles in a "9-8-8-8" fashion or an "11-8-8-6" fashion, these embodiments may be extended to any size multiplier and multiplicand, such as a 32-bit, 128-bit, 256-bit or 512-bit multiplier and a 32-bit, 128-bit, 256-bit or 512-bit multiplicand. For example, an embodiment in which 63 PPs are generated may be implemented in a "11-8-8-8-8-8-8-6" fashion.

Figure 4A:
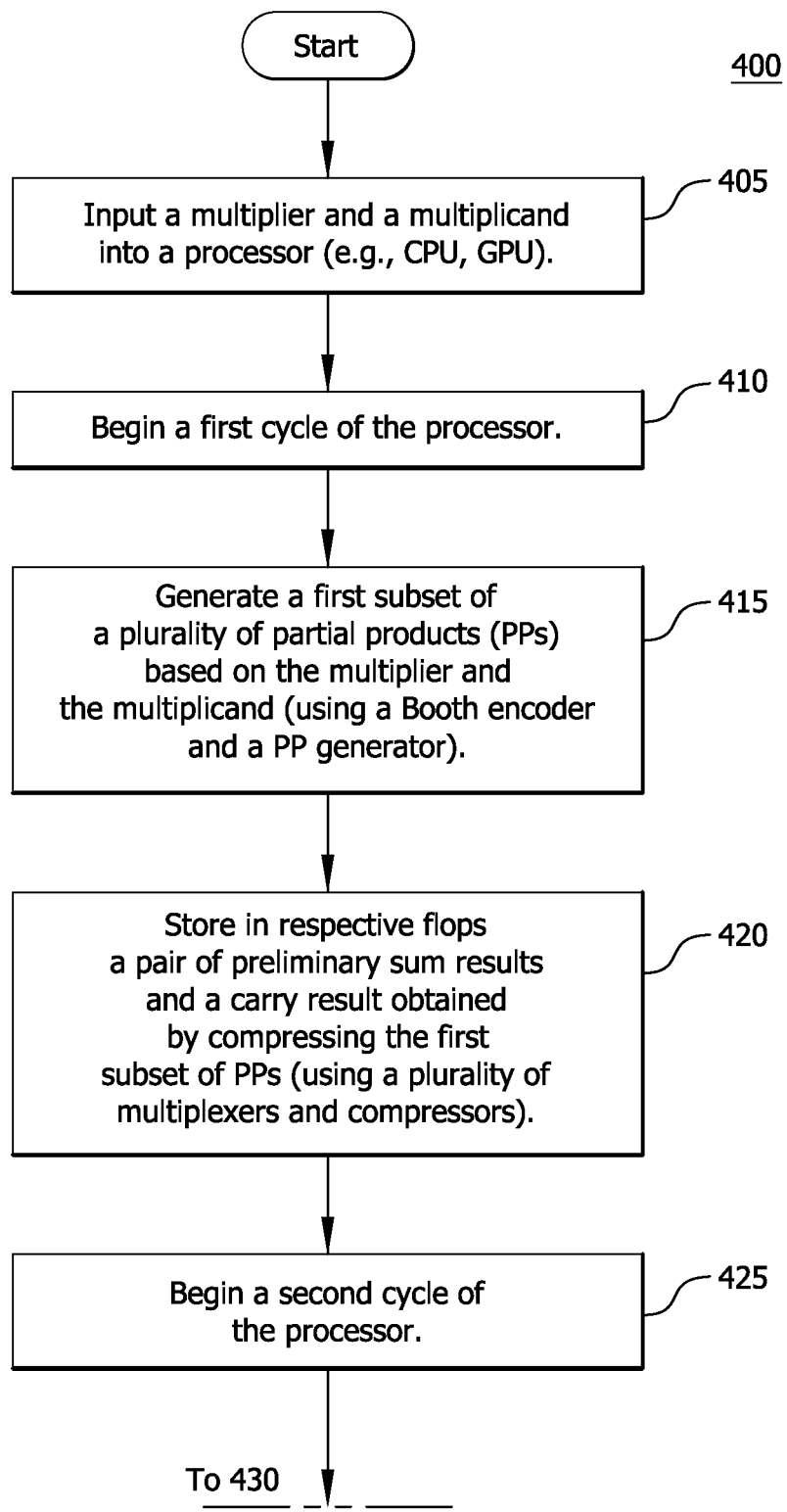
FIGS. 4A, 4B and 4C, taken together, are a flow diagram of a procedure for multiplying a multiplier and a multiplicand to generate a product in accordance with the second embodiment of FIGS. 3A-3E.
Figure 4B:
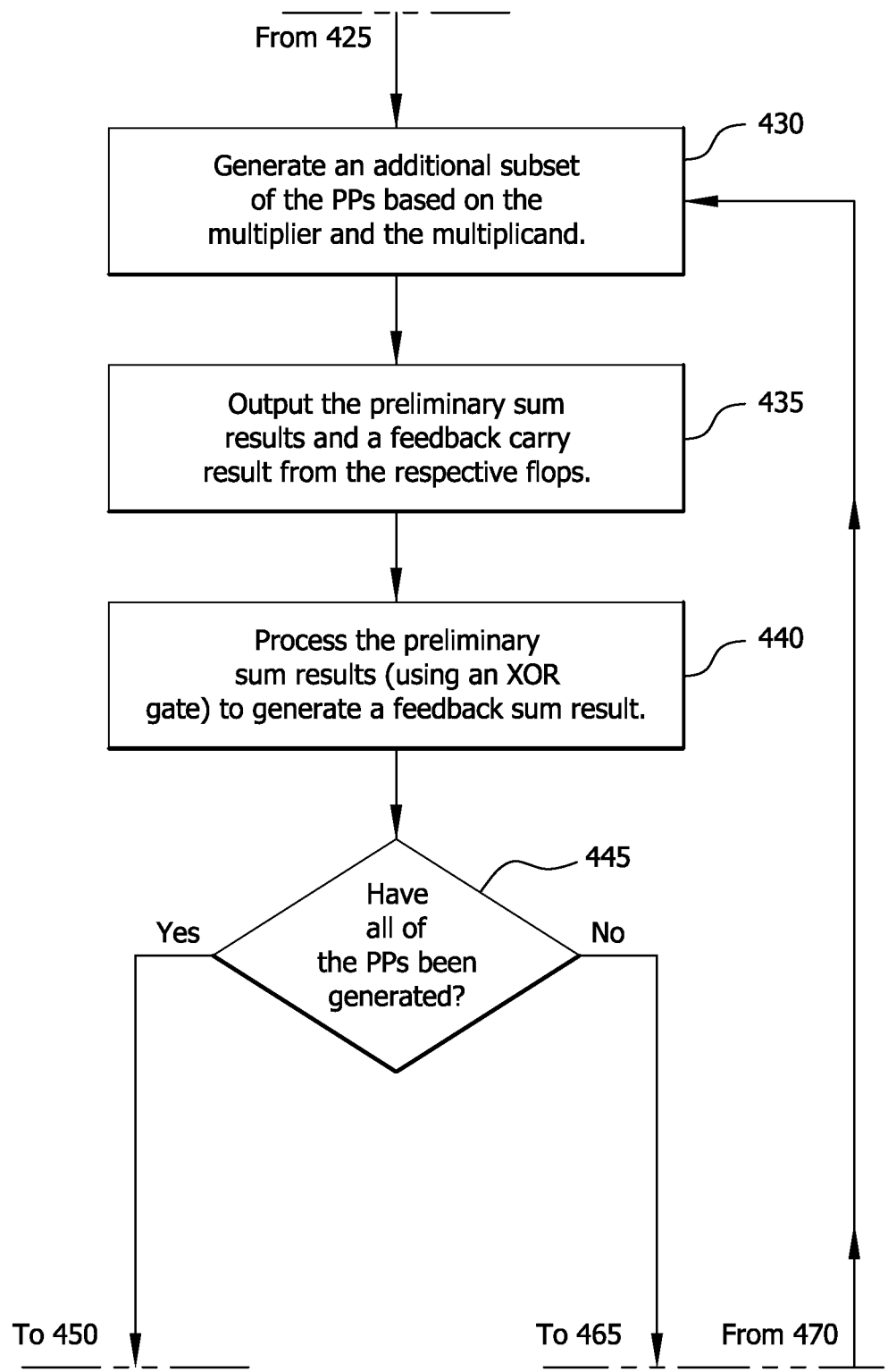
Figure 4C:
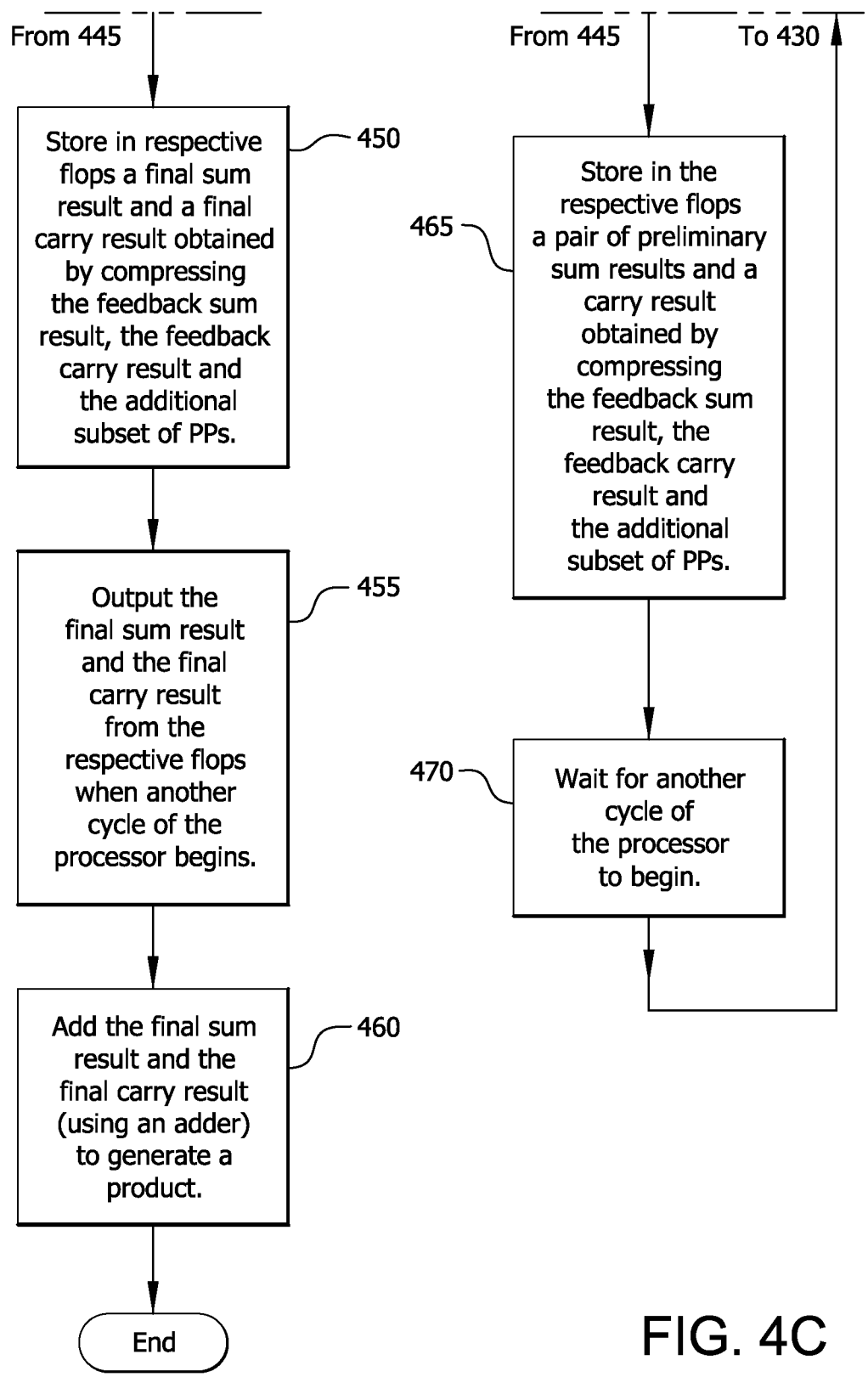

FIGS. 4A, 4B and 4C, taken together, are a flow diagram of a procedure 400 for multiplying a multiplier and a multiplicand to generate a product in accordance with the second embodiment of FIGS. 3A-3E.

As shown in FIG. 4A, a multiplier and a multiplicand are input into a processor (e.g., CPU, GPU and the like), (405). When a first cycle of the processor begins, (410), a first subset of a plurality of PPs is generated based on the multiplier and the multiplicand (using a Booth encoder and a PP generator), (415), and a pair of preliminary sum results and a carry result obtained by compressing the first subset of PPs (using a plurality of multiplexers and compressors) are stored in respective flops (420).

As shown in FIGS. 4A and 4B, when a second cycle of the processor begins, (425), an additional subset of the PPs is generated based on the multiplier and the multiplicand, (430), the pair of preliminary sum results and a feedback carry result are outputted from the respective flops (435), and the pair of preliminary sum results is processed (using an XOR gate) to generate a feedback sum output (440). A determination is then made as to whether all of the PPs have been generated (445).

As shown in FIG. 4C, if all of the PPs have been generated, a final sum result and a final carry result obtained by compressing (i.e., merging) the feedback sum result, the feedback carry result and the additional subset of PPs are stored in respective flops (450). When another cycle of the processor begins, the final sum result and the final carry result are output from the respective flops (455), and the final sum result and the final carry result are added (using an adder) to generate a product (460).

If all of the PPs have not been generated, a pair of preliminary sum results and a carry result obtained by compressing (i.e., merging) the feedback sum result, the feedback carry result and the additional subset of PPs are stored in respective flops (465). When another cycle of the processor begins, the final sum result and the final carry result are output from the respective flops (455), the final sum result and the final carry result are added (using an adder) to generate a product (460). When another cycle of the processor begins, (470), the procedure 400 returns to step 430 of FIG. 4B.

Figure 5:
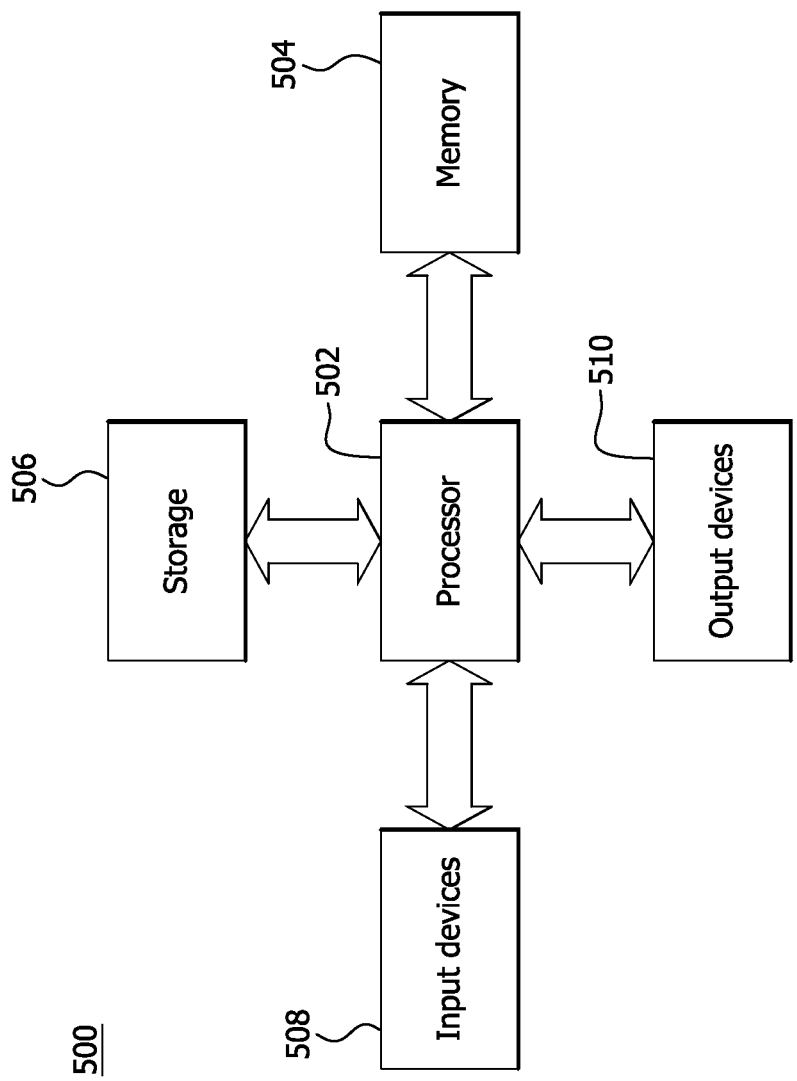
FIG. 5 is a block diagram of an example device in which one or more disclosed embodiments may be implemented.

FIG. 5 is a block diagram of an example device 500 in which one or more disclosed embodiments may be implemented. The device 500 may include, for example, a computer, a gaming device, a handheld device, a set-top box, a television, a mobile phone, or a tablet computer. The device 500 includes a processor 502 having a similar configuration as the processor 100 of FIG. 1, a memory 504, a storage 506, one or more input devices 508, and one or more output devices 510. It is understood that the device 500 may include additional components not shown in FIG. 5.

The processor 502 may include a central processing unit (CPU), a graphics processing unit (GPU), a CPU and GPU located on the same die, one or more processor cores, wherein each processor core may be a CPU or a GPU. The memory 504 may be located on the same die as the processor 502, or may be located separately from the processor 504. The memory 504 may include a volatile or non-volatile memory, for example, random access memory (RAM), dynamic RAM, or a cache.

The storage 506 may include a fixed or removable storage, for example, hard disk drive, solid state drive, optical disk, or flash drive. The input devices 508 may include a keyboard, a keypad, a touch screen, a touch pad, a detector, a microphone, an accelerometer, a gyroscope, a biometric scanner, or a network connection, (e.g., a wireless local area network card for transmission and/or reception of wireless IEEE 802 signals). The output devices 510 may include a display, a speaker, a printer, a haptic feedback device, one or more lights, an antenna, or a network connection, (e.g., a wireless local area network card for transmission and/or reception of wireless IEEE 802 signals).

In an alternative implementation, the device 500 may further include an input driver and an output driver (not shown), whereby the input driver communicates with the processor 502 and the input devices 508, and permits the processor 502 to receive input from the input devices 508. The output driver communicates with the processor 502 and the output devices 510, and permits the processor 502 to send output to the output devices 510.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), an accelerated processing unit (APU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method of a processor performing multiplication of a multiplier and a multiplicand to generate a product, the method comprising:

a) during a first cycle of the processor,
   generating a first subset of a plurality of partial products (PPs) based on the multiplier and the multiplicand; and
   storing in respective storage devices a pair of preliminary sum results and a carry result obtained by merging the first subset of PPs;
b) during another cycle of the processor:
   generating an additional subset of the PPs based on the multiplier and the multiplicand;
   outputting the pair of preliminary sum results and a feedback carry result from the respective storage devices; and
   processing the pair of preliminary sum results to generate a feedback sum result;
c) if all of the PPs have not been generated:
   storing in the respective storage devices a pair of preliminary sum results and a carry result obtained by merging the feedback sum result, the feedback carry result and the additional subset of PPs; and
   repeating step b); and
d) if all of the PPs have been generated:
   storing in respective storage devices a final sum result and a final carry result obtained by merging the feedback sum result, the feedback carry result and the additional subset of PPs; and
   adding the final sum result and the final carry result to generate the product.

2. The method of claim 1 wherein the processing of the pair of preliminary sum results comprises performing an XOR function on the pair of preliminary sum results.

3. The method of claim 1 wherein the processor generates four subsets of PPs over four cycles, respectively.

4. The method of claim 3 wherein a first one of the PP subsets includes 11 PPs, a second one of the PP subsets includes 8 PPs, a third one of the PP subsets includes 8 PPs and a fourth one of the PP subsets includes 6 PPs.

5. The method of claim 1 wherein the plurality of PPs includes 33 PPs.

6. The method of claim 1 wherein the multiplier is a 64-bit number and the multiplicand is a 64-bit number.

7. The method of claim 1 wherein the method is performed in an execution unit of the processor.

8. A processor for performing multiplication of a multiplier and a multiplicand to generate a product, the processor comprising:

a Booth encoder and a partial product (PP) generator configured to generate a plurality of PPs based on the multiplier and the multiplicand, wherein different subsets of the PPs are generated during respective cycles of the processor;

a plurality of compressors configured to merge each subset of the PPs to generate a pair of preliminary sum results and a carry result;

at least one storage device configured to store the preliminary sum results and the carry result, and output the stored preliminary sum results in a subsequent cycle of the processor;

a logic gate configured to process the preliminary sum results outputted by the at least one storage device;

wherein the at least one storage device is further configured to store a final sum result and a final carry result obtained by the compressors merging a feedback sum result generated by the logic gate, a feedback carry result outputted by the at least one storage device, and an additional subset of the PPs; and an adder configured to generate the product by adding a final sum result and a final carry result outputted by the at least one storage device after all of the PPs have been generated.

9. The processor of claim 8 further comprising a plurality of multiplexers having logic inputs that are selected on a cyclical basis.

10. The processor of claim 9 wherein the Booth encoder, the PP generator, the compressors, the multiplexers, the at least one storage device and the logic gate are located in an execution unit of the processor.

11. The processor of claim 9 wherein two PPs of a particular PP subset are input by the PP generator to respective first logic inputs of two of the multiplexers during a first cycle, a second cycle and a third cycle of the processor, and the first logic inputs are selected so that the two multiplexers output the two PPs to one of the compressors for merging with the other PPs of the particular PP subset.

12. The processor of claim 11 wherein the feedback sum result generated by the logic gate and the feedback carry result output by the at least one storage device are input to respective second logic inputs of the two multiplexers during a fourth cycle of the processor, and the second logic inputs are selected so that the two multiplexers output the feedback sum result and the feedback carry result to one of the compressors for merging with a particular PP subset.

13. The processor of claim 8 wherein the logic gate performs an XOR function on the pair of preliminary sum results.

14. The processor of claim 8 wherein the Booth encoder and the PP generator generate four subsets of PPs over four cycles of the processor, respectively.

15. The processor of claim 14 wherein a first one of the PP subsets includes 11 PPs, a second one of the PP subsets includes 8 PPs, a third one of the PP subsets includes 8 PPs and a fourth one of the PP subsets includes 6 PPs.

16. The processor of claim 8 wherein the plurality of PPs includes 33 PPs.

17. The processor of claim 8 wherein the multiplier is a 64-bit number and the multiplicand is a 64-bit number.

18. A non-transitory computer-readable storage medium configured to store a set of instructions used for manufacturing a semiconductor device, wherein the semiconductor device comprises:
   a Booth encoder and a partial product (PP) generator configured to generate a plurality of PPs based on the multiplier and the multiplicand, wherein different subsets of the PPs are generated during respective cycles of the processor;
   a plurality of compressors configured to merge each subset of the PPs to generate a pair of preliminary sum results and a carry result;
   at least one storage device configured to store the preliminary sum results and the carry result, and output the stored preliminary sum results in a subsequent cycle of the processor;
   a logic gate configured to process the preliminary sum results outputted by the at least one storage device;
   wherein the at least one storage device is further configured to store a final sum result and a final carry result obtained by the compressors merging a feedback sum result generated by the logic gate, a feedback carry result outputted by the at least one storage device, and an additional subset of the PPs; and
   an adder configured to generate the product by adding a final sum result and a final carry result outputted by the at least one storage device after all of the PPs have been generated.

19. The non-transitory computer-readable storage medium of claim 18 wherein the instructions are Verilog data instructions.

20. The non-transitory computer-readable storage medium of claim 18 wherein the instructions are hardware description language (HDL) instructions.

* * * * *